(12) United States Patent
Lee et al.

(10) Patent No.: US 9,629,268 B2
(45) Date of Patent: Apr. 18, 2017

(54) MOBILE TERMINAL

(71) Applicant: LG ELECTRONICS INC., Seoul (KR)

(72) Inventors: Hyoyeol Lee, Seoul (KR); Hosung Nam, Seoul (KR); Sooyong Song, Seoul (KR); Sungtaek Oh, Seoul (KR); Sanggil Park, Seoul (KR); Seongwoo Choi, Seoul (KR); Jaeyoung Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 131 days.

(21) Appl. No.: 14/712,639

(22) Filed: May 14, 2015

(65) Prior Publication Data
US 2015/0334859 A1 Nov. 19, 2015

(30) Foreign Application Priority Data

May 19, 2014 (KR) .................. 10-2014-0059893
Dec. 11, 2014 (KR) .................. 10-2014-0178772

(51) Int. Cl.
*H05K 5/02* (2006.01)
*G06F 21/32* (2013.01)
(Continued)

(52) U.S. Cl.
CPC ......... *H05K 5/0247* (2013.01); *G06F 21/32* (2013.01); *G06K 9/00013* (2013.01);
(Continued)

(58) Field of Classification Search
USPC ........................................ 361/749
See application file for complete search history.

(56) References Cited

U.S. PATENT DOCUMENTS

2007/0246341 A1 10/2007 Kim et al.
2008/0088600 A1* 4/2008 Prest .................. G06F 3/03547
345/173
(Continued)

FOREIGN PATENT DOCUMENTS

KR 10-2008-0049237 6/2008
KR 10-2010-0081082 7/2010
(Continued)

OTHER PUBLICATIONS

European Patent Office Application Serial No. 151670882, Search Report dated Oct. 12, 2015, 7 pages.
(Continued)

*Primary Examiner* — Eric Thomas
*Assistant Examiner* — Michael P McFadden
(74) *Attorney, Agent, or Firm* — Lee, Hong, Degerman, Kang & Waimey

(57) ABSTRACT

The present disclosure relates to a mobile terminal, and there is provided a mobile terminal including a terminal body having a front surface and a rear surface, a rear input unit comprising a first button portion externally exposed from the rear surface to receive a push input with a first function and a second button portion provided with keys disposed at both sides, respectively, around the first button portion to receive a push input with a second function different from the first function, and a sensor disposed at a lower portion of the first button portion, wherein the second button portion is provided with a through hole accommodating the first button portion to dispose the first button portion between the keys, and the sensor is disposed to overlap with an inner region of the through hole, and at least part thereof is formed to overlap with a first switch for activating the first button portion.

14 Claims, 20 Drawing Sheets

(51) Int. Cl.
  *H05K 1/02* (2006.01)
  *H05K 7/14* (2006.01)
  *H05K 5/00* (2006.01)
  *G06K 9/00* (2006.01)
  *H04M 1/02* (2006.01)
  *H04M 1/23* (2006.01)

(52) U.S. Cl.
  CPC ........ *G06K 9/00087* (2013.01); *H04M 1/026* (2013.01); *H05K 1/028* (2013.01); *H05K 5/0017* (2013.01); *H05K 5/0217* (2013.01); *H05K 7/1427* (2013.01); *H04M 1/236* (2013.01); *H04M 2250/12* (2013.01); *H05K 2201/10053* (2013.01); *H05K 2201/10151* (2013.01)

(56) References Cited

U.S. PATENT DOCUMENTS

2008/0207283 A1    8/2008   Zaitsu et al.
2013/0307818 A1    11/2013  Pope et al.
2014/0164976 A1*   6/2014   Kim ................ G06F 1/1643
                                              715/773

FOREIGN PATENT DOCUMENTS

| KR | 10-2011-0086307 | 7/2011 |
| KR | 10-2011-0113243 | 10/2011 |
| KR | 10-2012-0066392 | 6/2012 |
| KR | 10-2013-0045111 | 5/2013 |
| KR | 10-2013-0055322 | 5/2013 |
| KR | 10-2014-0003160 | 1/2014 |

OTHER PUBLICATIONS

Korean Intellectual Property Office Application Serial No. 10-2014-0059893, Office Action dated Oct. 31, 2015, 7 pages.
Korean Intellectual Property Office Application Serial No. 10-2014-0059893, Office Action dated Apr. 21, 2015, 6 pages.

* cited by examiner

MOBILE TERMINAL

CROSS-REFERENCE TO RELATED APPLICATIONS

Pursuant to 35 U.S.C. §119(a), this application claims the benefit of earlier filing date and right of priority to Korean Patent Application No. 10-2014-0059893, filed on May 19, 2014 and Korean Application No. 10-2014-0178722, filed on Dec. 11, 2014, the contents of which are incorporated by reference herein in their entirety.

BACKGROUND OF THE INVENTION

1. Field of the Invention

The present disclosure relates to a mobile terminal for allowing one or more sensors to be provided on a rear surface thereof or simplifying a rear input unit according to user's convenience.

2. Description of the Related Art

Terminals may be generally classified into mobile/portable terminals or stationary terminals according to their mobility. Mobile terminals may also be classified as handheld terminals or vehicle mounted terminals according to whether or not a user can directly carry the terminal.

The functionality of the mobile terminal has been diversified. For example, there are functions of data and voice communication, photo capture and video capture through a camera, voice recording, music file reproduction through a speaker system, and displaying an image or video on the display unit. Some terminals may additionally perform an electronic game play function or perform a multimedia play function. In particular, recent terminals may receive multicast signals for providing video contents such as broadcasts, videos, television programs, or the like.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

In recent years, the execution of various functions using a rear surface of the mobile terminal has been generally used, but it is not easy to provide a sensor for performing various functions due to a limited space on the rear surface of the terminal.

In particular, a sensor for enhancing the performance of a rear camera may be required, but cause a problem in its layout structure.

On the other hand, as increasing the needs of a user who wants to have a simple design, it requires to enhance the structure of a rear input unit. In addition, there is a problem of increasing its material cost and size due to the complexity of a rear design.

SUMMARY OF THE INVENTION

An aspect of the present disclosure is to solve the foregoing problem and other problems. Another aspect of the present disclosure is to arrange a sensor having various functions within or adjacent to a rear input unit.

In particular, an aspect of the present disclosure is to modularize a RGB sensor for enhancing camera performance with a rear input unit or flash.

Another aspect of the present disclosure is to provide a mobile terminal for simplifying the structure of a rear input unit.

In order to accomplish the above and other objects, according to an aspect of the present disclosure, there may be provided a mobile terminal including a terminal body having a front surface and a rear surface, a rear input unit comprising a first button portion externally exposed from the rear surface to receive a push input with a first function and a second button portion provided with keys disposed at both sides, respectively, around the first button portion to receive a push input with a second function different from the first function, and a sensor disposed at a lower portion of the first button portion, wherein the second button portion is provided with a through hole accommodating the first button portion to dispose the first button portion between the keys, and the sensor is disposed to overlap with an inner region of the through hole, and at least part thereof is formed to overlap with a first switch for activating the first button portion.

According to an aspect of the present invention, the mobile terminal may further include a flexible circuit board disposed at a lower portion of the first and the second button portion, wherein the flexible circuit board includes a sensor formation portion formed with the sensor, and a switch formation portion connected to the sensor formation portion and at least part of which is separated to vertically overlap with the sensor formation portion, and formed with a first and a second switch for activating the first and the second button portion, respectively.

According to an aspect of the present invention, the switch formation portion may include a first switch formation portion formed with the first switch and a second switch formation portion formed with the second switch, and the first and the second switch formation portion may be formed on the same plane or different planes.

According to an aspect of the present invention, the first and the second switch formation portion may be integrally formed when the first and the second switch formation portion are formed on the same plane, and the first switch formation portion may be separated from the sensor formation portion, and electrically connected to the second switch formation portion by means of an elastic connecting member.

According to an aspect of the present invention, the mobile terminal may further include a protrusion for electrically connecting the first switch or second switch to a flexible circuit board when pressing the first or the second button portion, wherein the protrusion includes a first protrusion for pressing the first switch and a second protrusion for pressing the second switch, and the first switch is disposed on an upper surface or lower surface of the first switch formation portion.

According to an example associated with the present disclosure, the first protrusion may be formed on a lower surface of the sensor formation portion when the first switch is formed on an upper surface of the first switch formation portion, and the first protrusion may be formed in contact with the first switch when the first switch is formed on a lower surface of the first switch formation portion.

According to an aspect of the present invention, a stiffener for enhancing the rigidity of the sensor formation portion and switch formation portion may be disposed between the sensor formation portion and switch formation portion.

According to an aspect of the present invention, a slit may be formed between the first switch formation portion and second switch formation portion.

According to an aspect of the present invention, the sensor may be a RGB sensor or fingerprint sensor.

According to an aspect of the present invention, an inner surface of the first button portion may have a predetermined curvature when the sensor is a RGB sensor.

According to an aspect of the present invention, when the sensor is a fingerprint sensor, a sliding or touch mode may be applied to the fingerprint sensor.

According to an aspect of the present invention, the first function may include a power on/off function, and recognize user's fingerprint information by means of the fingerprint sensor when pressing the first button portion to turn on or off power in a state that his or her own certification has been completed.

According to an aspect of the present invention, a lock of the mobile terminal may be automatically released when touching the fingerprint sensor to enter a home screen page.

According to an aspect of the present invention, when a login window requiring his or her own certification is displayed through the display unit, the user's fingerprint information may be recognized by the fingerprint sensor to be automatically logged in.

The effects of a mobile terminal and a control method according to the present disclosure will be described as follows.

According to at least one of embodiments of the present disclosure, it has an advantage capable of implementing a simple rear surface.

Furthermore, according to at least one of embodiments of the present disclosure, it has an advantage capable of modularizing an auto focusing device on a rear input unit.

According to at least one of embodiments of the present disclosure, a RGB sensor may be disposed adjacent to an LDAF, thereby having an advantage of enhancing camera performance.

Furthermore, according to at least one of embodiments of the present disclosure, sensors having different functions as well as the RGB sensor may be formed within a user input unit or modularized with a flash, thereby having an advantage of mounting a larger number of sensors thereon.

Further scope of applicability of the present invention will become apparent from the detailed description given hereinafter. However, it should be understood that the detailed description and specific examples such as preferred embodiments of the invention are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 is an exploded perspective view in which FIG. 5 is seen from a front side;

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
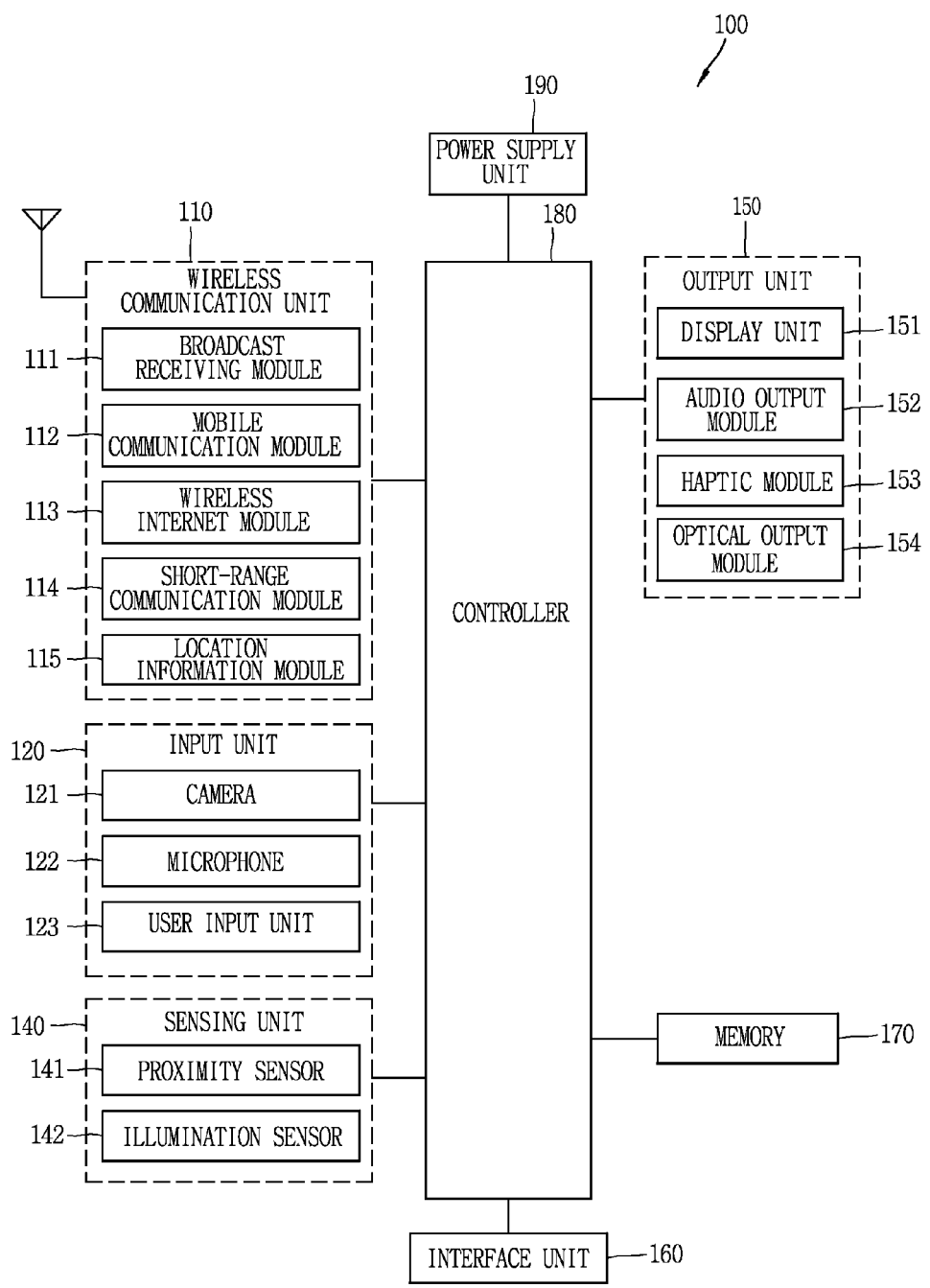
FIG. 1A is a block diagram for explaining a mobile terminal associated with the present disclosure.
Figure 1B:
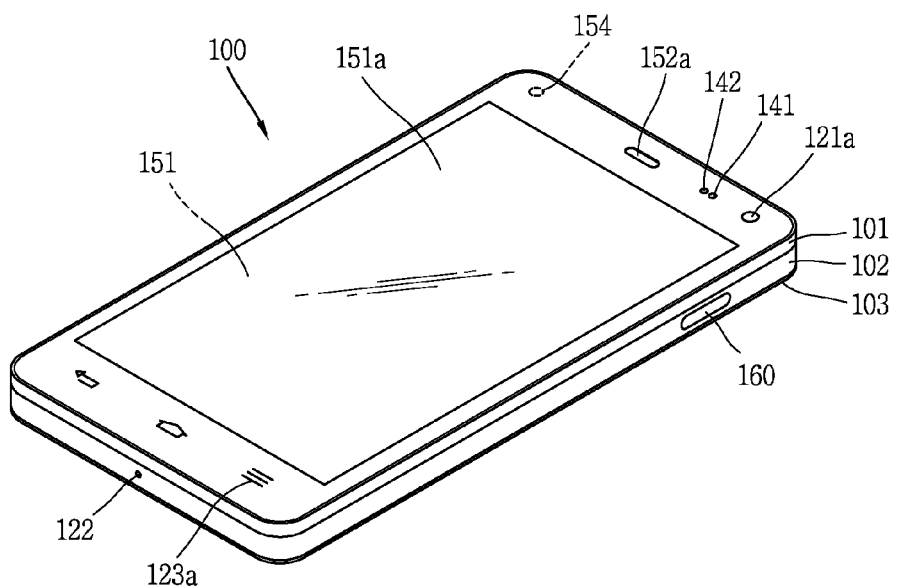
FIGS. 1B and 1C are conceptual views illustrating an example in which a mobile terminal associated with the present disclosure is seen from different directions.
Figure 1C:
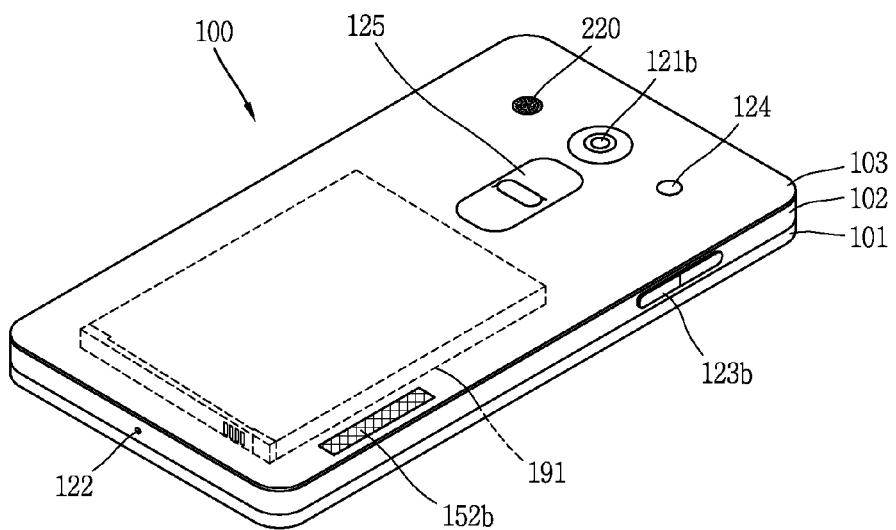

Referring to FIGS. 1A through 1C, FIG. 1A is a block diagram of a mobile terminal in accordance with the present disclosure, FIGS. 1B and 1C are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner.

Here, the terminal body may be understood as a conception which indicates the mobile terminal 100 as at least one assembly.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

Here, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be separated from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Hereinafter, embodiments associated with a control method that can be implemented in the mobile terminal having the foregoing configuration will be described with reference to the attached drawings. It should be understood by those skilled in the art that the present invention can be embodied in other specific forms without departing from the concept and essential characteristics thereof.

According to an embodiment of the present disclosure, there is provided a technology of modularizing an auto focusing device 220 (laser detection auto focusing (LDAF)) used to capture a picture with a rear input unit 125 including a first button portion 125a for allowing a push input to a first function and a second button portion 125b for allowing a push input to a second function. The first function may be a function associated with on/off of power or activation of the display unit, and the second function may be a function associated with volume adjustment for audio output from the terminal body or a scroll function for display information on the display unit. Here, the first button portion 125a is disposed between the second button portions 125b.

Figure 2:
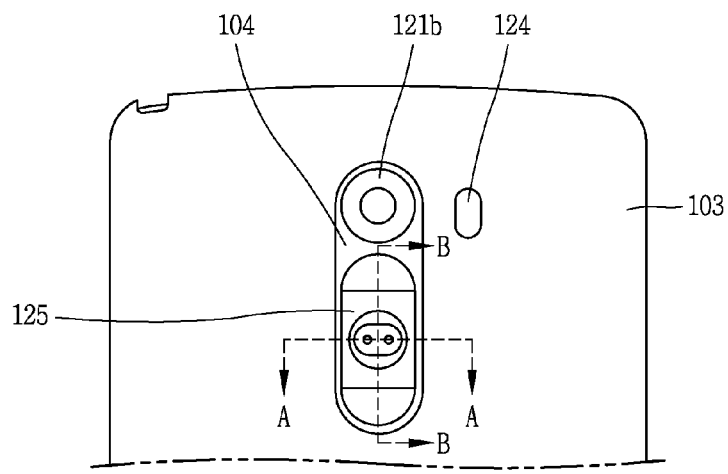
FIG. 2 is a rear view including a rear input unit of a mobile terminal associated with an embodiment of the present disclosure.
Figure 5:
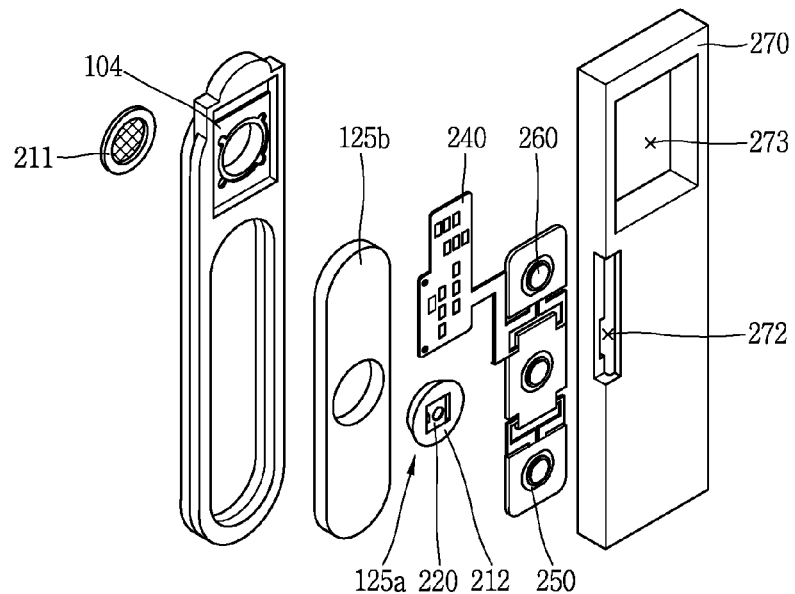
FIG. 5 is an exploded perspective view in which a rear input unit according to an embodiment of the present disclosure is seen from a rear side.

FIG. 2 is a partial schematic diagram of a mobile terminal illustrating a rear input unit 125 associated with an embodiment of the present disclosure, and FIG. 5 is an exploded perspective view in which a rear input unit according to an embodiment of the present disclosure is seen from a rear side, and referring to FIGS. 2 and 5, it is seen that the auto focusing device 220 is integrated in the first button portion 125a of the rear input unit 125. Here, a camera module 121b is disposed at an upper side of the rear input unit 125, and a flash is disposed at one side of the camera module 121b.

Here, the camera module 121b and rear input unit 125 are individually disposed or modularized, and FIG. 2 illustrates a view in which the camera module 121b and rear input unit 125 are modularized by means of a plate 104.

Figure 3:
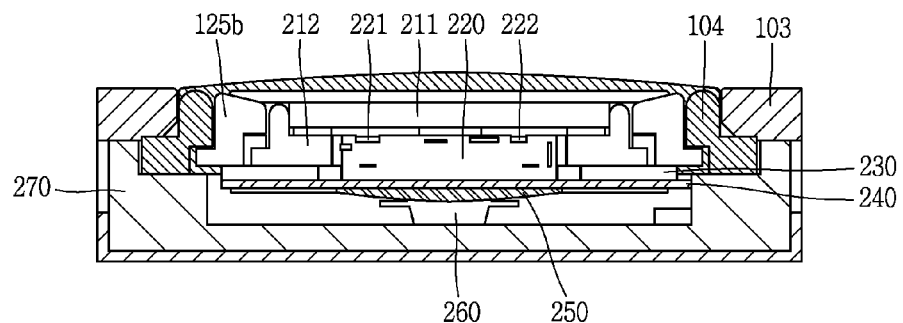
FIG. 3 is a cross-sectional view taken along line A-A of FIG. 2.
Figure 4:
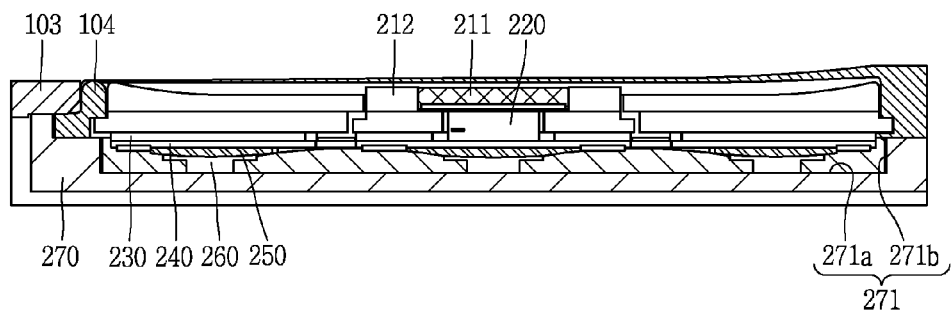
FIG. 4 is a cross-sectional view taken along line B-B of FIG. 2.
Figure 6:
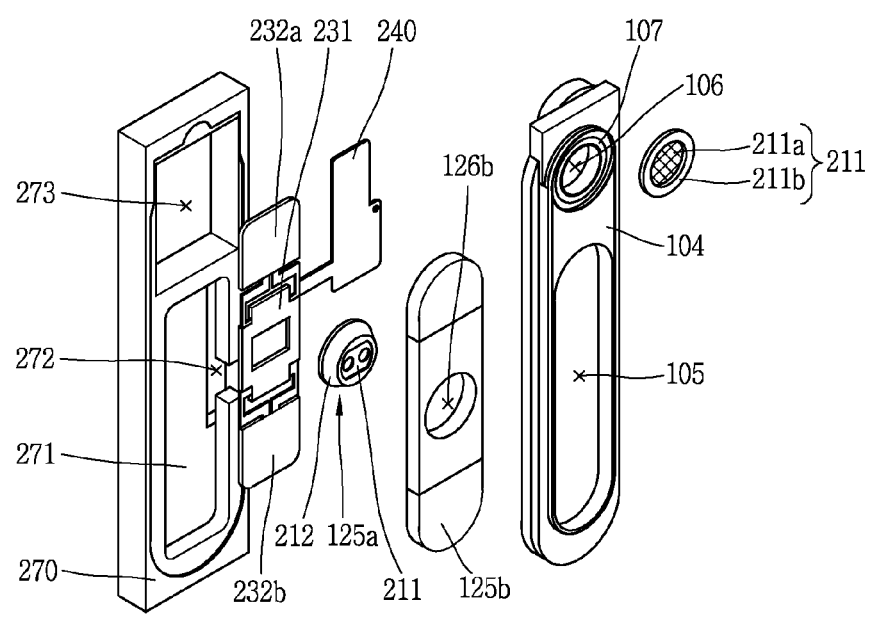
Figure 7:
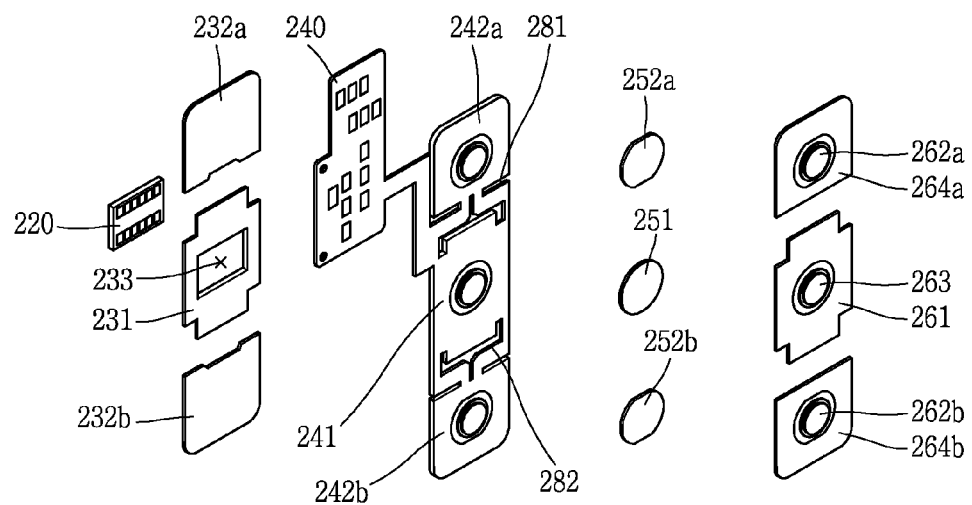
FIG. 7 is a detail exploded perspective view illustrating main elements according to an embodiment of the present disclosure.

FIG. 3 is a cross-sectional view taken along line A-A of FIG. 2, and FIGS. 5 through 7 are exploded perspective views illustrating the rear input unit 125 according to an embodiment of the present disclosure, and the present disclosure will be described below with reference to FIGS. 5 through 7.

The first button portion 125a and second button portion 125b are exposed to an outside, and the first button portion 125a is inserted into a through hole 126b formed on the second button portion 125b. The first button portion 125a may have a circular shape, for example, and the second button portion 125b may have an oval shape having the first button portion 125a, but may not be necessarily limited to this.

Here, a step is formed between the first button portion 125a and second button portion 125b to prevent the first button portion 125a from being released to an outside of the second button portion 125b. According to an embodiment of the present disclosure, the auto focusing device 220 is integrated in the first button portion 125a and a window 211 is disposed at an upper portion of the auto focusing device 220. More specifically, the first button portion 125a is provided with an accommodation portion 212, and the auto focusing device 220 is accommodated into the accommodation portion 212. The window 211 should be a light transmitting material since the auto focusing device 220 measures a distance using laser. In other words, the auto focusing device 220 includes a light emitting portion 221 for transmitting laser and a light receiving portion 222 for receiving laser, and performs a function of measuring a distance using a phase difference between an output signal being transmitted and a reception signal being received as well as getting auto focus when capturing a photo or video using this.

In other words, auto focusing (AF) in the related art takes time to cover the entire screen due to focusing through an image processing without laser, but the auto focusing device 220 measures a distance with a phase difference through laser, and thus focusing is quickly processed with laser for a distance between 0-50 cm and processed with a conventional AF mode for the remaining distance.

A flexible circuit board 240 is disposed at a lower portion of the rear input unit 125 to activate the rear input unit 125, and a switch 250 (metal dome) is disposed at a lower portion of the flexible circuit board 240, and an actuator 260 is disposed at a lower portion of the switch 250.

The switch 250 may include a first switch 251 for activating the first button portion 125a and a second switch 252a, 252b for activating the second button portion 125b.

Owing to such a layout, the switch 250 is electrically connected to the flexible circuit board 240 by the actuator 260 when a user presses the first button portion 125a or second button portion 125b to activate the first button portion 125a or second button portion 125b. The actuator 260 has a protrusion shape.

The flexible circuit board 240 is flexible and thus required to be stiffened due to its low rigidity, and to this end, according to an embodiment of the present disclosure, a stiffener 230 may be disposed on an upper surface of the flexible circuit board 240. The stiffener 230 may be a stainless material, and adhered to the flexible circuit board 240 by means of an adhesive tape. Here, the actuator 260, 262a, 262b, 263 may be formed on a white sheet 261.

On the other hand, the flexible circuit board 240 has a first portion 241 and a second portion 242a, 242b corresponding to the first button portion 125a and second button portion 125b, respectively, and the first portion 241 and second portion 242a, 242b may be pressed at the same time when the first button portion 125a or second button portion 125b is pressed by a user. According to an embodiment of the present disclosure, a dividing slit is formed on the flexible circuit board 240 to prevent this. In other words, as illustrated in FIG. 8, a first slit 281, 281a, 281b formed from both ends to an inside to divide between the first portion 241 and second portion 242a, 242b and a second slit 282, 282a, 282b formed more adjacent to the center of the first portion 241 than the first slit 281, 281a, 281b and bent toward the center of the first portion 241 may be formed to divide the first portion 241 from the second portion 242a, 242b.

Figure 8:
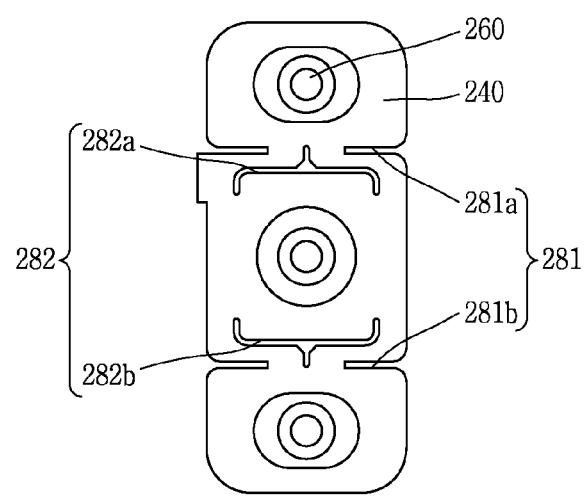
FIG. 8 is a plan view illustrating a flexible circuit board of the present disclosure.

Furthermore, the first slit 281, 281a, 281b is formed between the first portion 241 and second portion 242a, 242b, and it is illustrated in FIG. 8 that the first slit 281, 281a, 281b is formed in a straight line to form the first portion 241 and second portion 242a, 242b at a substantially right angle, but may not be necessarily limited to this, and an end thereof may be bent to round an edge of the first portion 241 and second portion 242a, 242b.

The second slit 282, 282a, 282b is shown in a "}"-shape, and both ends of the second slit 282, 282a, 282b extends toward the center of the first portion 241. As a result, the first portion 241 and second portion 242a, 242b are clearly divided to prevent the first portion 241 and second portion 242a, 242b from being pressed at the same time. Furthermore, the first slit 281, 281a, 281b and second slit 282, 282a, 282b are formed at both sides of the first portion 241, and the second slit 282, 282a, 282b is formed adjacent to the center of the first portion 241 than the first slit 281.

Furthermore, referring to FIG. 7, the stiffener 230 for enhancing the rigidity of the flexible circuit board 240 is also divided into a first portion 231 and a second portion 232a, 232b, respectively, since the flexible circuit board 240 is divided into the first portion 241 and second portion 242a, 242b. In particular, a through hole 233 is formed within the stiffener 230, and the auto focusing device 220 is inserted into the through hole 233, and the auto focusing device 220 is brought into contact with the flexible circuit board 240.

On the other hand, the rear input unit 125 is integrally formed and modularized with the camera module 121b, and the rear input unit 125 and a camera cover 211 are inserted and fixed to the plate 104 formed with two through holes 105, 106. The camera cover 211 may include a supporting portion and a lens 211a. Here, the camera cover 211 is mounted on a recess portion 107 of the plate 104.

Furthermore, the rear input unit 125 and camera cover 211a are placed on a base member 270, and a through hole 272 is formed to connect a printed circuit board disposed at a lower portion of the base member 270 to the flexible circuit board 240. Here, an accommodation groove 271 for placing the rear input unit 125 thereon is recessed on the base member 270, and a through hole 273 is formed at one side of the accommodation groove 271 to insert the camera module 121b thereinto.

Hereinafter, another embodiment of the present disclosure will be described.

Figure 9:
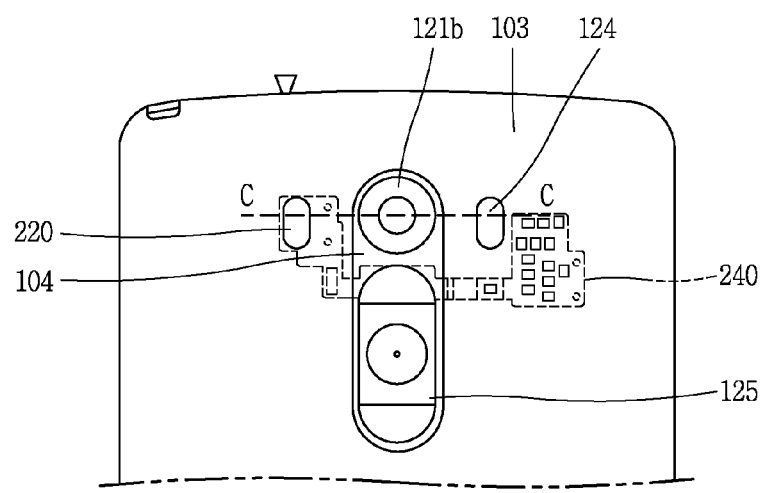
FIG. 9 is a partial rear view illustrating a mobile terminal according to another embodiment of the present disclosure.
Figure 10:
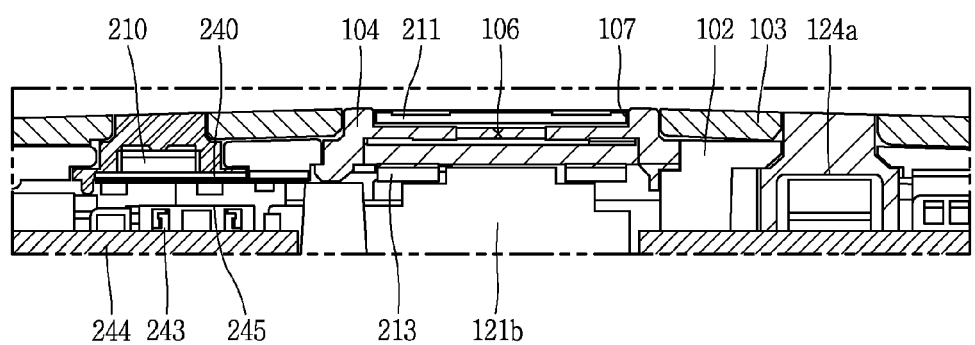
FIG. 10 is a cross-sectional view taken along line C-C of FIG. 9.

FIG. 9 is a partial rear view illustrating a mobile terminal according to another embodiment of the present disclosure, and FIG. 10 is a cross-sectional view taken along line C-C of FIG. 9, and the present disclosure will be described below with reference to FIGS. 9 and 10.

According to an embodiment of the present disclosure, the rear input unit 125 and the auto focusing device 220 are not modularized but independently configured therein. However, the camera module 121b and rear input unit 125 are modularized by means of the plate 104. Furthermore, a flash 124 is provided at one side of the camera module 121b, and the auto focusing device 220 is disposed at the other side thereof.

According to an embodiment of the present disclosure, it has the same configuration as that of the foregoing embodiment excluding that the auto focusing device 220 is integrally formed with the first button portion 125a. In other words, the auto focusing device 220 is mounted on the flexible circuit board 240 formed on the rear input unit 125 whereas the flash 124 is mounted on a printed circuit board 244. Due to this, the height of the auto focusing device 220 is different from that of the flash 124.

Figure 11A:
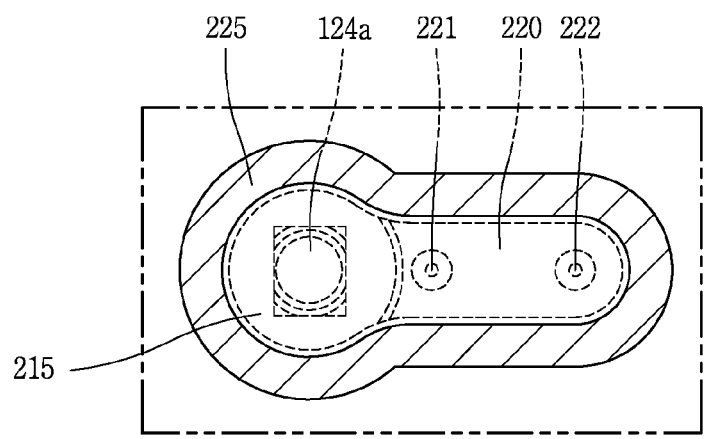
FIGS. 11A, 11B, 12A and 12B are schematic diagrams illustrating that a flash and an auto focusing device according to an embodiment of the present disclosure are modularized.
Figure 11B:
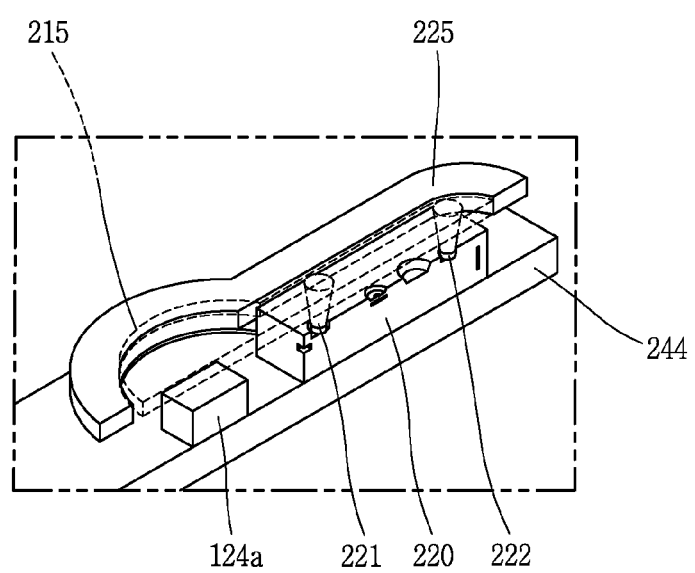

The flash 124 is activated with a flash LED 124a or flash module 124b. The auto focusing device 220 and flash 124 are surrounded by a mold member 225, and covered by a window 215. In other words, referring to FIGS. 11A and 11B, the flash LED 124a and auto focusing device 220 are disposed at an upper portion of the printed circuit board 244, and integrally surrounded by the mold member 225, and covered by the window 215. Here, the flash LED 124a and auto focusing device 220 are mounted on the printed circuit board 244 to be adjacent to each other.

Figure 12A:
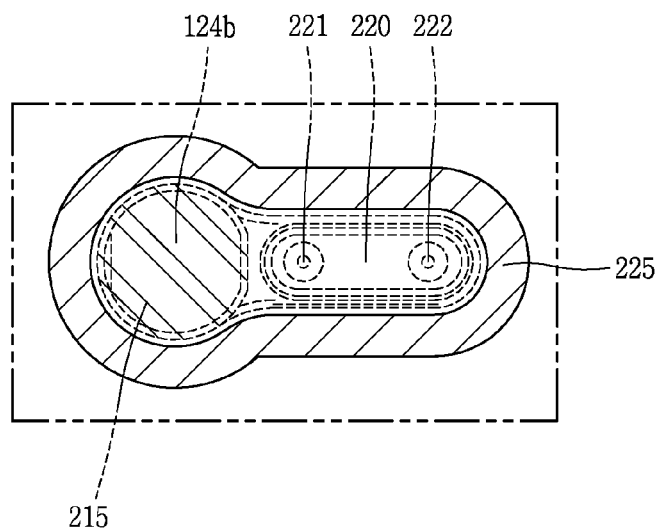
Figure 12B:
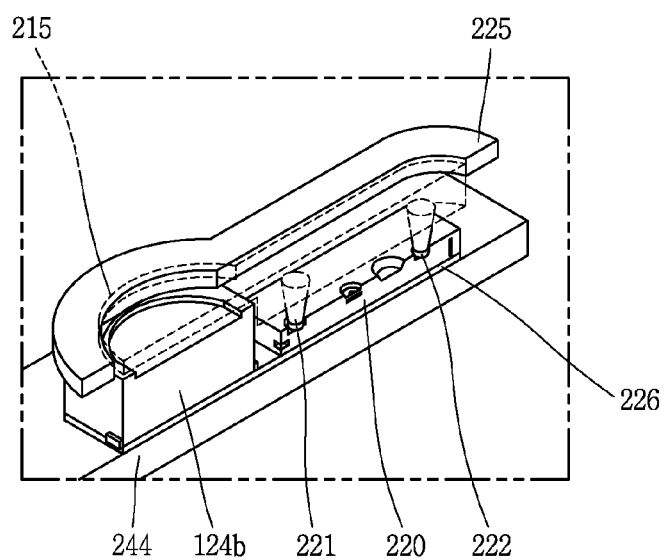

On the other hand, as illustrated in FIGS. 12A and 12B, the flash module 124b in which a flash is modularized and the auto focusing device 220 are disposed on a base portion 226, and the base portion 226 may be electrically connected to the printed circuit board 244.

Even at this time, the flash module 124b and auto focusing device 220 may be formed to be adjacent to each other.

In this manner, the flash module 124b and auto focusing device 220 may be modularized, and the flash 124 may be the flash LED 124a or flash module 124b. In this manner, the auto focusing device 220 and the flash are modularized to minimize the size thereof.

Hereinafter, other embodiments that can be implemented in a mobile terminal associated with an embodiment of the present disclosure will be described with reference to the accompanying drawings.

Figure 13:
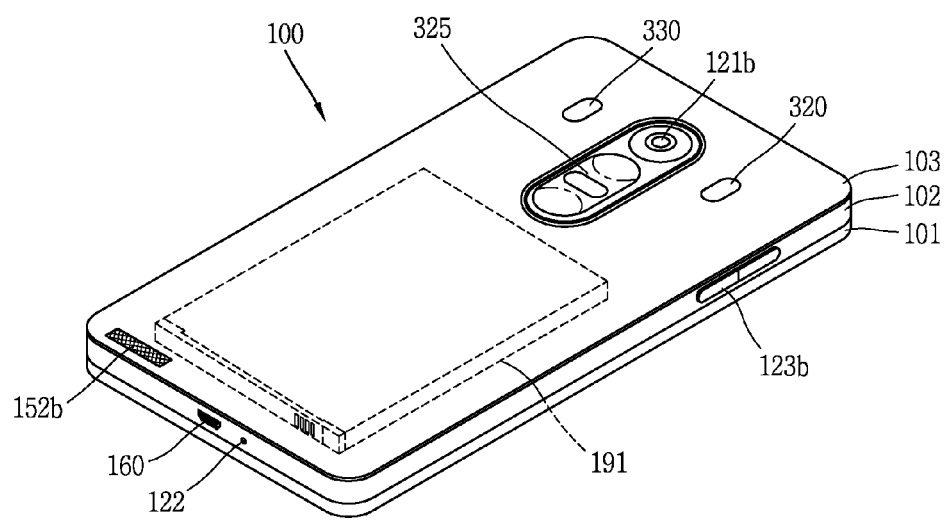
FIG. 13 is a perspective view in which a mobile terminal associated with the present disclosure is seen from a rear side.

First, FIG. 13 is a perspective view in which a mobile terminal associated with the present disclosure is seen from a rear side, and FIG. 14 is a rear view and a bottom view illustrating a mobile terminal associated with an embodiment of the present disclosure, and it is shown that a rear input unit 325 is provided at an upper rear side of the mobile terminal 100, and an auto focusing device 330 (laser detection auto focusing (LDAF)) is disposed at one side of the rear input unit 325, and a flash unit 320 is disposed at the other side of the rear input unit 325. Here, the rear input unit 325 may include a first button portion 325a exposed to a rear surface of the terminal body to perform a first function and a second button portion 325b disposed adjacent to the first button portion 325a to perform a second function. Furthermore, an audio output unit 152b is formed at a lower portion of the mobile terminal 100.

The first function may be a function associated with on/off of power or activation of the display unit, and the second function may be a function associated with volume adjustment for audio output from the terminal body or a scroll function for display information on the display unit. Here, the first button portion 125a is disposed between the second button portions 125b. Accordingly, the second button portion 325 may be disposed to be divided into a top and a bottom section or a left and a right section, and the first button portion 325a is disposed between the second button portions 325 or therewithin.

Figure 20:
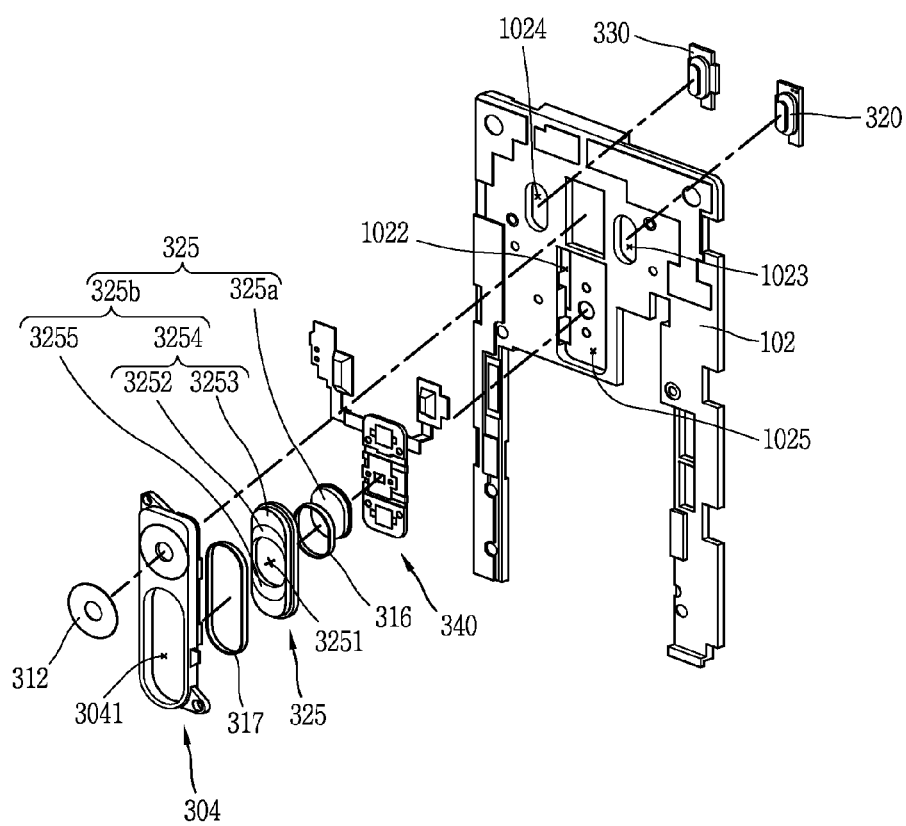
FIG. 20 is a partial exploded perspective view illustrating a mobile terminal associated with an embodiment of the present disclosure.

In other words, FIG. 20 is a partial exploded perspective view illustrating a mobile terminal associated with an embodiment of the present disclosure, and referring to FIG. 20, the mobile terminal may include a first button portion 325a externally exposed from a rear surface of the mobile terminal 100 to receive a push input with a first function, and a second button portion 325b provided with keys 3254, 3255 disposed at both sides, respectively, around the first button portion 325a to receive a push input with a second function different from the first function.

The first button portion 325a is formed to pass through the second button portion 325b between the keys 3254, 3255. In other words, a through hole 3251 is formed on the second button portion 325b. According to the drawing, the keys 3254, 3255 are formed with a protruded surface as a surface exposed to an outside, and a surface opposite to the protruded surface may be formed with a plane. Through this, the user can recognize which key he or she has been brought into contact with tactile feeling.

More specifically, the keys 3254, 3255 are provided with an inclined surface 3252 inclined toward the through hole 3251 to form a height difference between the keys 3254, 3255 and the first button portion 325a. The inclined surface 3252 is a surface adjacent to the first button portion 325a on the protruded surface, and formed with a curved surface. The first button portion 325a is formed with a shape protruded at an outer side than an end portion of the inclined surface 3252. Furthermore, an auxiliary surface 3253 with an opposite inclination to the inclined surface 3252 or with a plane is formed on the keys 3254, 3255. Here, the first button portion 325a and second button portion 325b are formed of different materials. Through the structure and material, the user may easily distinguish the first and the second button portion 325a, 325b.

In the above, a case where the rear input unit 325 is configured with a plurality of buttons has been described, but the present disclosure may not be necessarily limited to this. For example, the rear input unit 325 may be provided with a single button. Furthermore, though it is illustrated a case where the rear input unit 325 is provided with a plurality of buttons in the following description, a function defined by an input to any one of the plurality of buttons may be applicable to the single button.

It is illustrated in FIG. 14 that the camera module 121b and rear input unit 325 are formed with a module by means of a supporting member 304, but the present disclosure may not be necessarily limited to this, and the rear input unit 325 and camera module 121b may be independently formed from each other.

Furthermore, as illustrated in FIG. 20, the rear input unit 325 and camera cover 312 is inserted and fixed to the supporting member 304, and camera cover 312 is configured to include a lens, and the camera cover 312 is placed on a recessed portion of the supporting member 304.

Figure 14A:
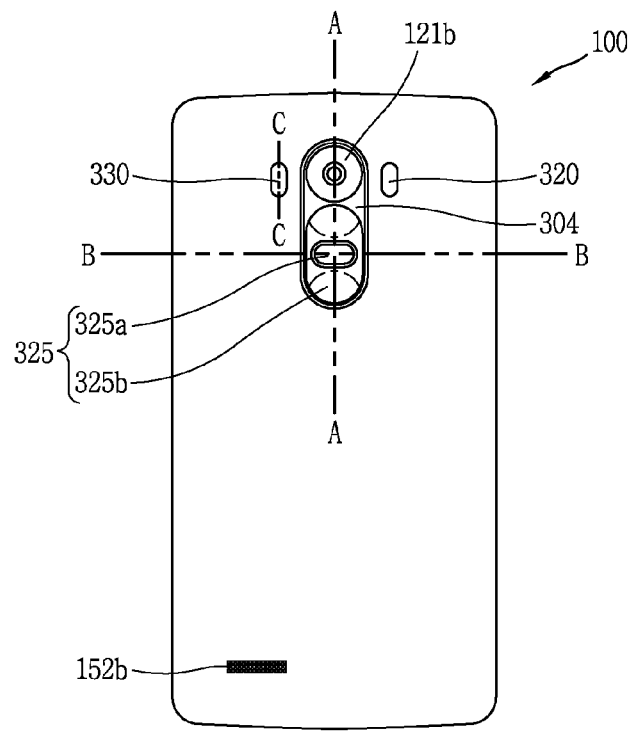
FIGS. 14A and 14B are a rear view and a bottom view illustrating a mobile terminal associated with an embodiment of the present disclosure.
Figure 15:
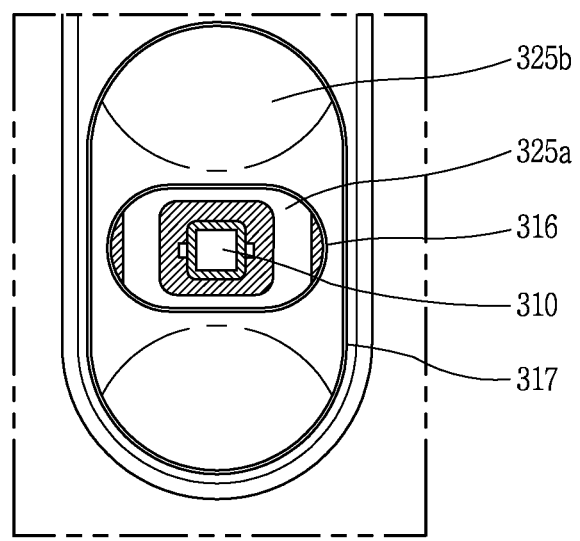
FIG. 15 is an enlarged view illustrating a user input unit associated with an embodiment of the present disclosure.
Figure 16:
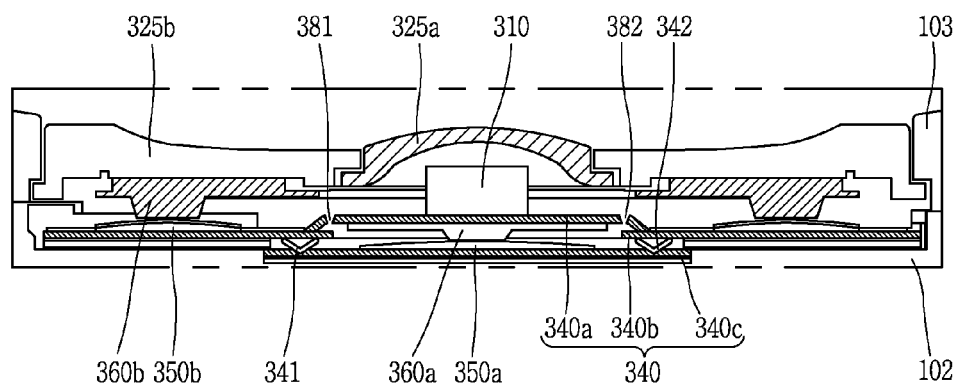
FIG. 16 is a cross-sectional view taken along line A-A of FIG. 14A.
Figure 17:
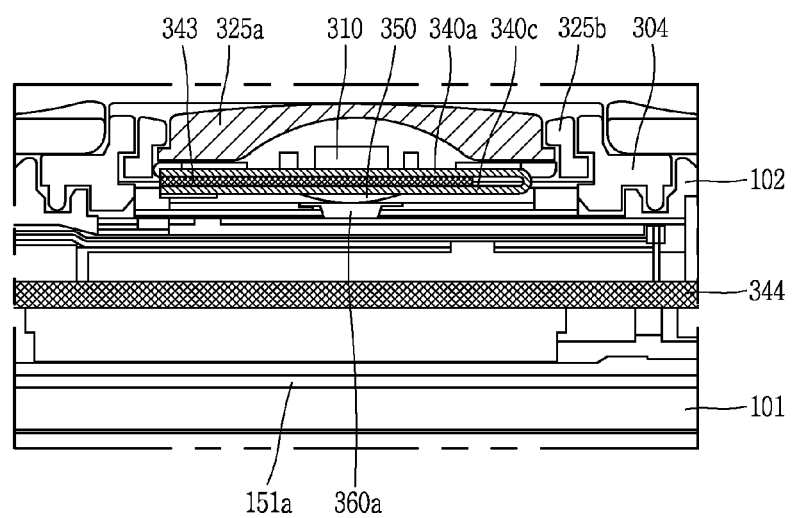
FIG. 17 is a cross-sectional view taken along line B-B of FIG. 14A.

FIG. 15 is an enlarged view illustrating a rear input unit associated with an embodiment of the present disclosure, and FIG. 16 is a cross-sectional view taken along line A-A of FIG. 14A, and FIG. 17 is a cross-sectional view taken along line B-B of FIG. 14A, and FIG. 18 is a plan view and a perspective view illustrating a flexible circuit board associated with an embodiment of the present disclosure, and hereinafter, the present disclosure will be described with reference to FIGS. 15 through 18.

The mobile terminal 100 according to an embodiment of the present disclosure may further include a flexible circuit board 340 disposed at a lower portion of the first button portion 325a and second button portion 325b and connected to a printed circuit board 344, and a first sensor 310 disposed at a lower portion of the first button portion 325a as illustrated in FIG. 17. The first sensor 310 may be any one of a RGB sensor, a heartbeat sensor and fingerprint sensor. The first sensor 310 is disposed within the first button portion 325a or disposed at a lower portion of the first button portion 325a as illustrated in FIGS. 15 through 17. The first button portion 325a may be formed in a dome shape. Furthermore, the first sensor 310 is disposed to overlap with an inner region of the through hole 3251 (refer to FIG. 20), and at least part thereof is formed to overlap with a first switch 350a for activating the first button portion 325a. Here, the first sensor 310 and first switch 350a are formed on the flexible circuit board 340, and the first sensor 310 and first switch 350a are spaced apart in a vertical direction (thickness direction of the mobile terminal).

According to an embodiment of the present disclosure, since the first sensor 310 and the first button portion 325a may be formed to overlap with each other, thereby causing a problem in the layout of a switch for activating the first sensor 310 and first button portion 325a. In other words, when pressing the first button portion 325a, the first sensor 310 should not be pressed. To this end, according to an embodiment of the present disclosure, the flexible circuit board 340 may include a sensor formation portion 340a and a switch formation portion 340b, 340c connected to the sensor formation portion 340a but at least part of which is separated therefrom to overlap with the sensor formation portion 340a and formed with a switch 350a, 350b for activating the first and the second button portion 325a, 325b on one surface thereof.

The first sensor 310 is disposed on an upper surface of the sensor formation portion 340a, and the first switch 350a for activating the first button portion 325a is formed on the switch formation portion 340b, 340c, particularly, the first switch formation portion 340c, separated from the sensor formation portion 340a, thereby allowing a portion of the flexible circuit board 340 for activating the first sensor 310 to differ from a formation position of the flexible circuit board 340 for activating the first button portion 325a.

Here, the mobile terminal 100 according to an embodiment of the present disclosure may further include a first and a second protrusion 360a, 360b for electrically connecting the switch 350a, 350b to the flexible circuit board 340 while pressing the first button portion 325a or second button portion 325b. The switches 350a, 350b may be a dome switch, a piezo switch, or the like.

The second button portion 325b, second switch 350b, second switch formation portion 340b, second protrusion 360b are formed with a pair, and thus reference numerals will be shown only for any one thereof on the drawing.

As illustrated in FIG. 16, the switch 350a, 350b according to an embodiment of the present disclosure may include a first switch 350a disposed at a lower portion of the first button portion 325a to activate the first button portion 325a and a second switch 350b disposed at a lower portion of the second button portion 325b to activate the second button portion 325b.

Furthermore, the protrusion 360a, 360b presses the first switch 350a and second switch 350b to perform a function of activating the first and the second button portion 325a, 325b, and may include a first protrusion 360a for pressing the first switch 350a to activate the first button portion 325a and a second protrusion 360b for pressing the second switch 350b to activate the second button portion 325b.

The first switch 350a is disposed on an upper surface or lower surface of the first switch formation portion 340c, and as illustrated in FIG. 16, when the first switch 350a is formed on an upper surface of the first switch formation portion 340c, the first protrusion 360a is formed on a lower surface of the sensor formation portion 340a.

Figure 21:
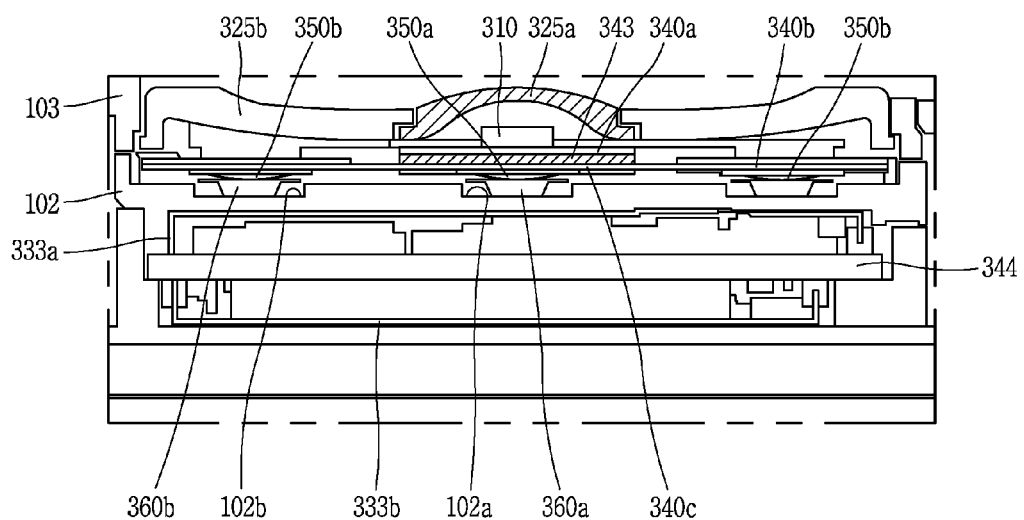
FIG. 21 is a partial cross-sectional view illustrating a mobile terminal associated with an embodiment of the present disclosure.

Furthermore, FIG. 21 is a partial cross-sectional view illustrating the mobile terminal 100 according to another embodiment of the present disclosure, and when the first switch 350a is formed on a lower surface of the first switch formation portion 340c as illustrated in FIG. 21, the first protrusion 360a may be formed in contact with the first switch 350a. FIG. 21 illustrates a view in which the first switch formation portion 340c and second switch formation portion 340b are integrally formed on the flexible circuit board 340.

In this manner, the first and the second switch formation portion 340b, 340c may be formed on the same plane or different planes, and it should be understood that FIG. 16 illustrates a view in which the first and the second switch formation portion 340b, 340c are formed on different planes, and FIG. 21 illustrates a view in which the first and the second switch formation portion 340b, 340c are formed on the same plane. When the first and the second switch formation portion 340b, 340c are formed on the same plane as illustrated in FIG. 21, the first and the second switch formation portion 340b, 340c may be formed as an integral body.

According to an embodiment of the present disclosure, it is illustrated that the formation direction of the second switches 350b formed in a pair is the same, but according to circumstances, they are formed in different directions. For example, the second switch 350b may be formed to be convex toward an inside or outside of the mobile terminal 100 in a similar manner that the formation direction of the first switch 350a is convex toward an outside of the mobile terminal 100 (in case of FIG. 16) or convex toward an inside of the mobile terminal 100 (in case of FIG. 21) as described above. Furthermore, the first and the second protrusion 360a, 360b may not be necessarily formed to be convex toward the first and the second switch 350a, 350b, and the first and the second switch 350a, 350b may be formed to be convex in the same direction as that of the first and the second protrusion 360a, 360b. In this manner, according to an embodiment of the present disclosure, the shape and layout structure of the switch and protrusion may not be particularly limited.

Furthermore, as illustrated in FIG. 17, the switch formation portion 340b, 340c may include a first switch formation portion 340c formed with the first switch 350a and a second switch formation portion 340b formed with the second switch 350b, and a first stiffener 343 for enhancing a mechanical rigidity of the sensor formation portion 340a and first switch formation portion 340c is disposed between the sensor formation portion 340a and first switch formation portion 340c. The first stiffener 343 prevents the flexible circuit board 340 from being bent while pressing the first button portion 325a to enhance the rigidity of the flexible circuit board 340. The first stiffener 343 may be metal or plastic. Here, the protrusion 360a, 360b may be formed on a white sheet (not shown).

In other words, the flexible circuit board 340 is low in rigidity due to its flexibility and thus required to enhance the rigidity, and to this end, according to an embodiment of the present disclosure, a stiffener is disposed on one surface of the flexible circuit board 340. The first stiffener 343 according to an embodiment of the present disclosure may be a stainless material, and adhered to the flexible circuit board 340 by means of an adhesive tape. It is similar to a case of a second stiffener 345 (refer to FIG. 24).

Figure 24:
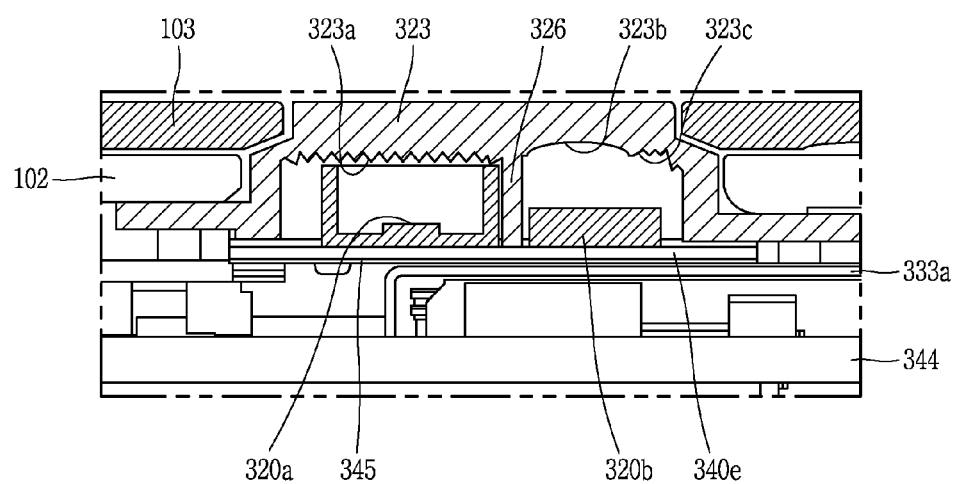
FIG. 24 is a cross-sectional view taken along line E-E of FIG. 22.

It is illustrated in FIG. 17 that the first stiffener 343 is formed only between the sensor formation portion 340a and first switch formation portion 340c, but the first stiffener 343 may be also formed in an integrated or separated manner on an upper surface of the flexible circuit board 340. Furthermore, as illustrated in FIG. 24, a second stiffener 345 may be also formed at a lower portion of the flash formation portion 340e formed with the flash unit 320 to enhance the rigidity of the flash formation portion 340e.

Figure 18A:
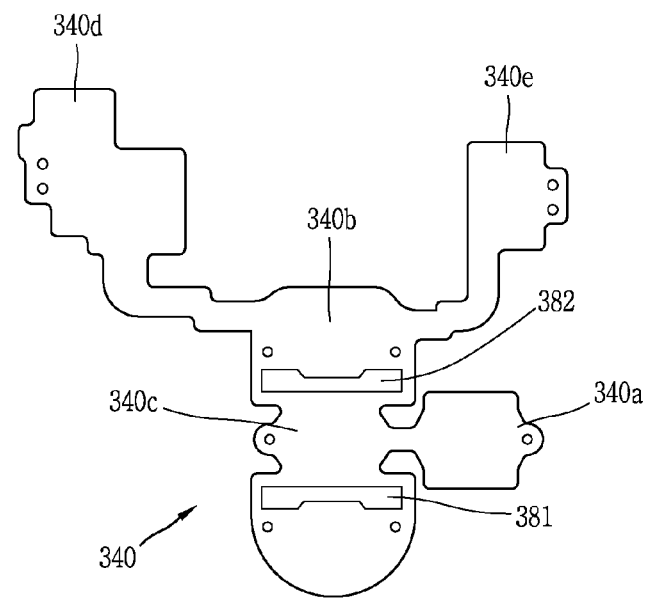
FIG. 18A is a plan view illustrating a configuration of the sensor formation portion associated with an embodiment of the present disclosure prior to being bent.
Figure 18B:
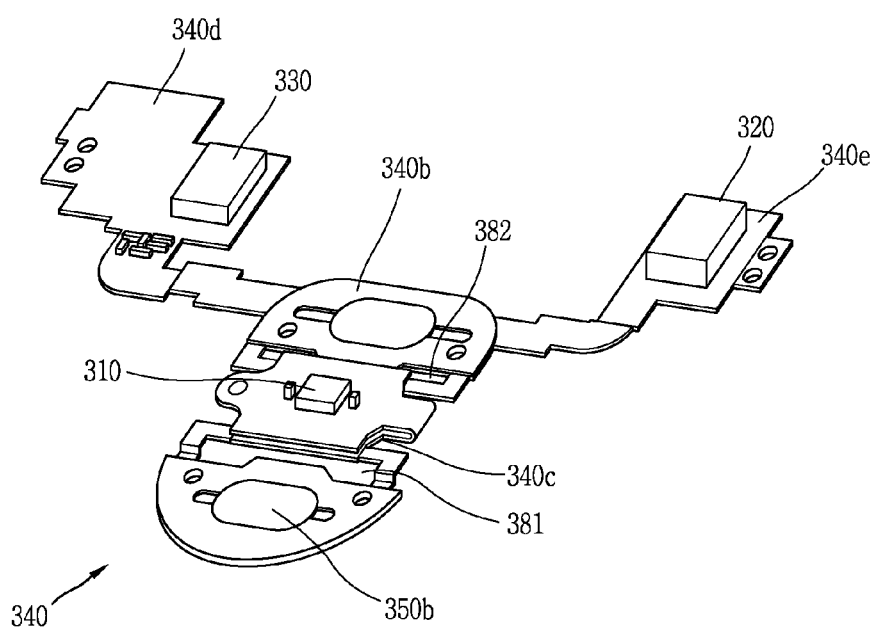
FIG. 18B is a perspective view illustrating a configuration of the sensor formation portion subsequent to being bent.

On the other hand, FIG. 18A is a view illustrating a configuration of the sensor formation portion 340a prior to being bent, and FIG. 18B is a view illustrating a configuration of the sensor formation portion 340a subsequent to being bent. As illustrated in FIGS. 18A and 18B, according to an embodiment of the present disclosure, slits 381, 382 may be formed at both sides of the first switch formation portion 340c, thereby minimizing the effect of the first and the second switch formation portion 340b, 340c on each other. In other words, the first and the second switch formation portion 340b, 340c may be separated by the slits 381, 382.

In other words, the flexible circuit board 340 may have the first switch formation portion 340c and second switch formation portion 340b corresponding to the first button portion 325a and second button portion 325b, respectively, it may occur a case where the first switch formation portion 340c and second switch formation portion 340b are pressed at the same time when the first button portion 325a or second button portion 325b is pressed by the user. According to an embodiment of the present disclosure, in order to prevent this, dividing slits 381, 382 are formed on the flexible circuit board 340. In other words, as illustrated in FIGS. 18A and 18B, the dividing slits 381, 382 are formed at both sides of the first switch formation portion 340c to divide the first switch formation portion 340c from the second switch formation portion 340b.

As described above, according to an embodiment of the present disclosure, the sensor formation portion 340a and first switch formation portion 340c are spaced apart by a predetermined distance, and to this end, according to an embodiment of the present disclosure, the sensor formation portion 340a is extended and bent from the first switch formation portion 340c of the switch formation portion 340b, 340c as illustrated in FIGS. 18A and 18B. In this manner, according to an embodiment of the present disclosure, the first sensor 310 and first switch 350a are formed and bent on an outer surface of the sensor formation portion 340a and first switch formation portion 340c.

The sensor formation portion 340a may be bent as described above to secure a space in which the first stiffener 343 is disposed, thereby forming the first sensor 310 within the first button portion 325a as well as disposing it at a lower portion of the first button portion 325a.

However, the present disclosure may not be necessarily limited to this, as illustrated in FIG. 16, the first switch formation portion 340c may be separated from the sensor formation portion 340a, and electrically connected to the second switch formation portion 340b by means of elastic connecting members 341, 342.

Furthermore, more specifically considering FIG. 18A, it is seen that the flexible circuit board 340 includes a sensor formation portion 340a, a first switch formation portion 340c extended and formed from the sensor formation portion 340a, a second switch formation portion 340b formed at both sides of the first switch formation portion 340c, and a flash formation portion 340e and an auto focusing device formation portion 340d formed at both sides, respectively, from the second switch formation portion 340b. In addition, more specifically considering FIG. 18B, it is seen that the first sensor 310 is disposed on the sensor formation portion 340a, and the flash unit 320 is formed on the flash formation portion 340e, and the auto focusing device 330 is formed on the auto focusing device formation portion 340d.

According to an embodiment of the present disclosure, as illustrated in FIG. 16, the rear case 102 is recessed to locate the first switch formation portion 340c below the second switch formation portion 340b. The connecting members 341, 342 in FIG. 16 has elasticity, and electrically connect the first switch formation portion 340c and the second switch formation portion 340b. Here, the first switch formation portion 340c and second switch formation portion 340b are formed in a separated manner in FIG. 16, but the present disclosure may not be necessarily limited to this, and the first switch formation portion 340c and second switch formation portion 340b may be formed as an login. Furthermore, the connecting members 341, 342 are illustrated to connect the first switch formation portion 340c and second switch formation portion 340b in FIG. 16, but the sensor formation portion 340a and first switch formation portion 340c may be of course electrically connected to each other.

According to an embodiment of the present disclosure, the first button portion 325a is formed of a light transmitting material. In particular, a sensor using light transmitting properties, such as a RGB sensor, may be provided at a lower portion of the first button portion 325a, and thus according to an embodiment of the present disclosure, the first button portion 325a may be preferably formed of a light transmitting material. However, it is sufficient to transmit light therethrough, and thus not necessarily required to have a complete light transmitting material such as glasses, and a translucent material is also allowed. For an example, the first button portion 325a may be glass, transparent resin (for example, polycarbonate (PC)).

Here, the RGB sensor according to an embodiment of the present disclosure is a sensor used for the purpose of enhancing the image quality of a camera by performing a function of controlling white balance. In other words, the sensor analyzes the RGB bandwidth of a light source received at the RGB sensor to calibrate white balance, thereby analyzing color temperature to calibrate white balance suitable to the color temperature. When the first sensor 310 is a RGB sensor, an inner surface of the first button portion 325a may be preferably formed to have a predetermined curvature.

FIG. 20 is a partial exploded perspective view illustrating a mobile terminal associated with an embodiment of the present disclosure, in which the rear input unit 325 exposed to a rear surface of the mobile terminal 100 is exposed to an outside through a through hole 3041 formed on the supporting member 304, and part of the flexible circuit board 340 is disposed on a rear surface of the rear case 102 through a through hole 1022 formed on the rear case 102. The flash unit 320 and auto focusing device 330 are disposed on the flexible circuit board 340 disposed on a rear surface of the rear case 102. Here, the flash unit 320 and auto focusing device 330 are exposed to a rear surface of the mobile terminal 100 through a through hole 1023, 1024 formed on the rear case.

Here, an accommodation portion 1025 into which the flexible circuit board 340 is accommodated on the rear case 102 is recessed in an inward direction, and as illustrated in FIG. 21, when the first and the second switch 350a, 350b are formed at a lower portion of the first and the second switch formation portion 340b, 340c, a first recess portion 102a and a second recess portion 102b are formed at a lower portion of the first and the second switch formation portion 340b, 340c, and the first and the second protrusion 360a, 360b may be accommodated into the first recess portion 102a and second recess portion 102b. Furthermore, as illustrated in FIG. 21, according to an embodiment of the present disclosure, electronic elements may be mounted on both sides of the printed circuit board 344, and an upper shield can 333a and a lower shield can 333b surrounding them may be formed to shield electromagnetic waves by those shield cans 333a, 333b.

Furthermore, according to an embodiment of the present disclosure, there is provided a technology of connecting one or more antenna modules to extend a slot and enhance antenna performance.

Figure 26:
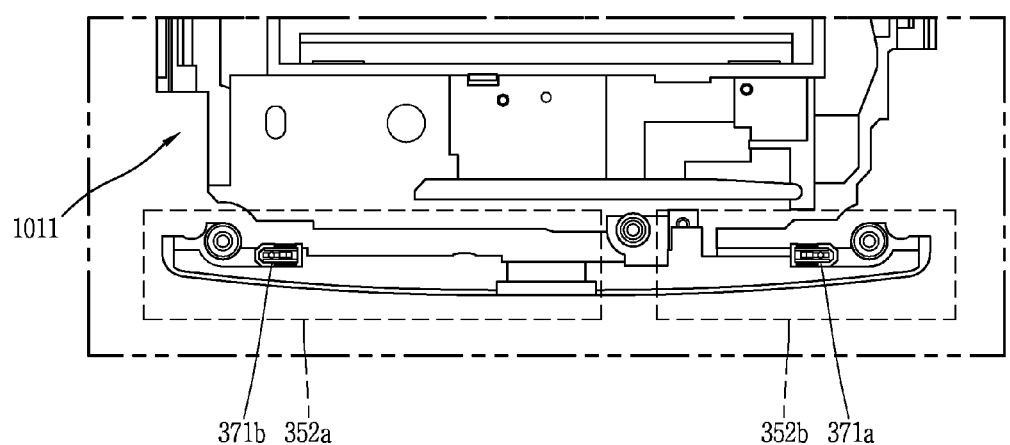
FIG. 26 is a view illustrating a frame of a front case associated with an embodiment of the present disclosure.
Figure 27A:
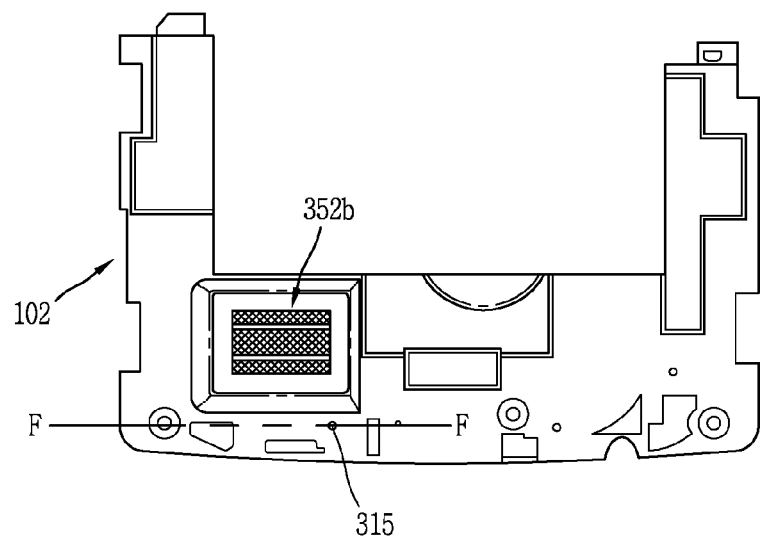
FIGS. 27A and 27B are views illustrating part of a rear case associated with an embodiment of the present disclosure.
Figure 27B:
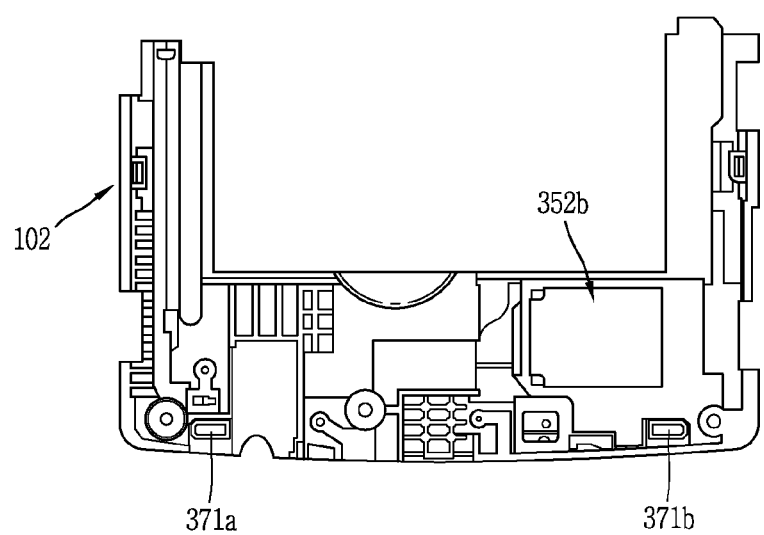
Figure 28:
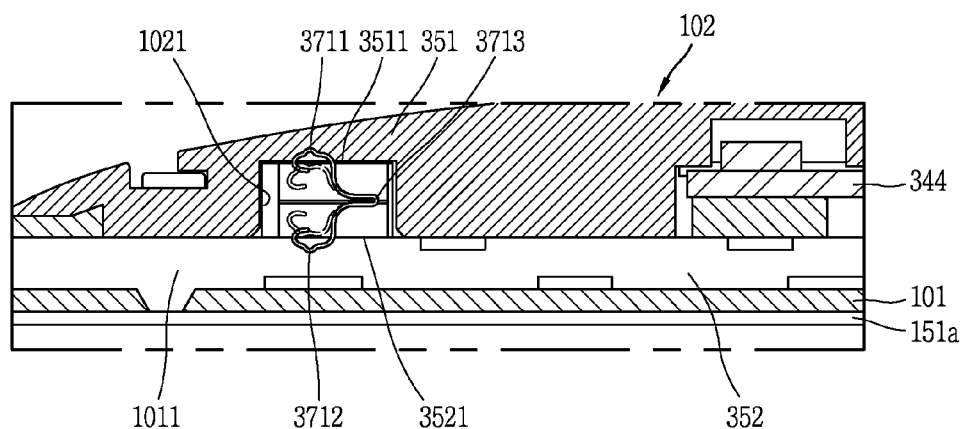
FIG. 28 is a cross-sectional view taken along line F-F of FIG. 27A.
Figure 29:
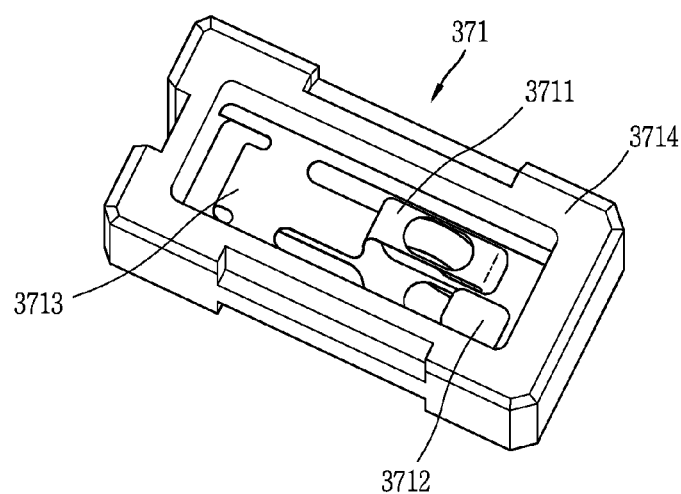
FIG. 29 is a perspective view of a double-sided clip member associated with an embodiment of the present disclosure.

FIG. 26 is a view illustrating a frame 1011 of a front case associated with an embodiment of the present disclosure, and FIGS. 27A and 27B are views illustrating part of both sides of the rear case 102 associated with an embodiment of the present disclosure, and FIG. 28 is a cross-sectional view taken along line F-F of FIG. 27A, and FIG. 29 is a perspective view of a double-sided clip member 371 associated with an embodiment of the present disclosure.

Hereinafter, the present disclosure will be described with reference to FIGS. 26 through 29.

As illustrated in FIG. 28, the terminal body may include a front case 101 and a rear case 102 coupled to the rear case 102 to limit a space, and a first antenna module 351 is formed on the rear case 102, and a second antenna module 352, 352a, 352b is disposed on the front case 101, and the first antenna module 351 and second antenna module 352, 352a, 352b are connected by means of the double-sided clip member 371, 371a, 371b.

Here, the first antenna module 351 may be a carrier having a first metal pattern 3511, and the second antenna module 352 may be a carrier having a second metal pattern 3521, and the first antenna module 351 may be a main antenna module, and the second antenna module 352 may be a slot antenna module.

If the second antenna module 352 is divided into two antenna modules 352a, 352b as illustrated in FIG. 26, then two double-sided clip members 371a, 371b are used to connect the respective second antenna module 352a, 352b and first antenna module 351.

Quantitative management may be allowed for an overlap between the first and the second metal pattern 3511, 3512 by the double-sided clip member 371, thereby effectively reducing a wireless variation. Moreover, it may be possible to solve a wireless problem on a contact point between antennas.

Here, the double-sided clip member 371, 371a, 371b is disposed on a groove 1021 formed on an inner side of the first antenna module 351 or second antenna module 352. It is illustrated in FIG. 28 that the groove 1021 is formed on an inner side of the first antenna module 351, but may not be necessarily limited to this, a groove may be also formed on an inner side of the second antenna module 352.

The double-sided clip member 371 connects the first and the second antenna module 351, 352 disposed at an upper and a lower portion thereof at the same time as illustrated in FIG. 29, and to this end, the double-sided clip member 371, 371a, 371b may include a body 3714, a fixed portion 3713 formed on the body 3714, and a first elastic body 3711 and a second elastic body 3712 extended from the fixed portion 3713 and extended toward an upper and a lower portion thereof around the fixed portion 3713.

The body 3714 has a substantially rectangular parallelepiped shape, and the fixed portion 3713, first elastic body 3711 and second elastic body 3712 are disposed therein. As illustrated in FIG. 28, the first elastic body 3711 and second elastic body 3712 in the form of being extended in a vertical direction around the fixed portion 3713 are rotated and elastically deformed around the fixed portion 3713 while being brought into contact with the first metal pattern 3511 or second metal pattern 3521.

Here, the frame 1011 may be a front case 101 or may be coupled to the front case 101 to enhance the rigidity of the front case 101 or may be a portion of the rear case 102. The frame 1011 may be connected to the printed circuit board 344 to connect the first and the second antenna module 351, 352 to each other, thereby enhancing antenna performance due to an increased antenna length. Furthermore, the double-sided clip member 371 may be used to secure an antenna mounting space.

Figure 14B:
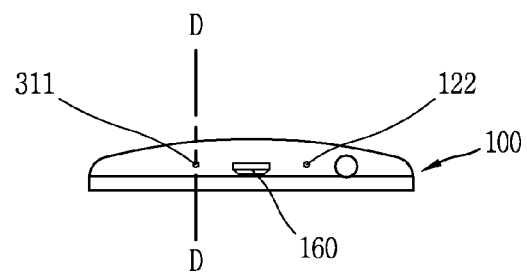
Figure 30:
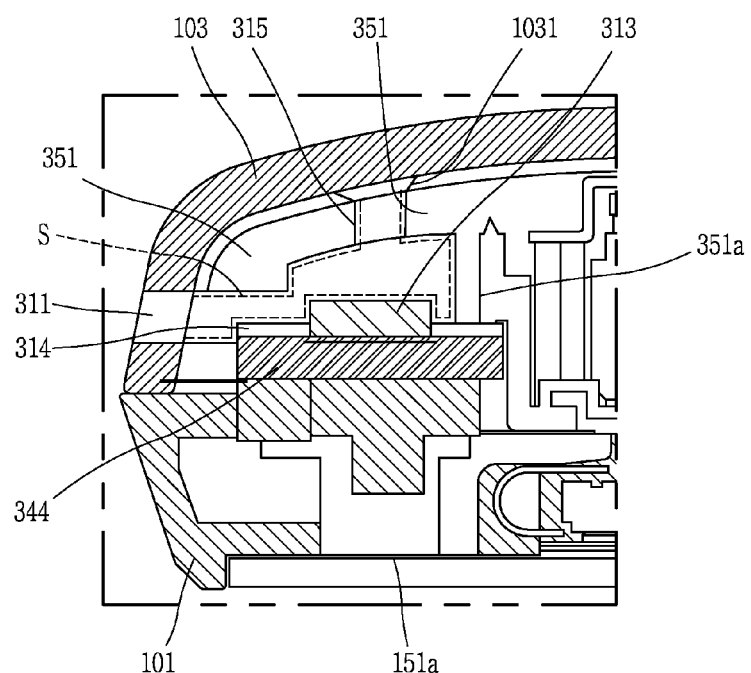
FIG. 30 is a cross-sectional view taken along line D-D of FIG. 14B.

FIG. 30 is a cross-sectional view taken along line D-D of FIGS. 14A and 14B, and according to an embodiment of the present disclosure, a first through hole 311 is formed at a lower end of the terminal body, and the present disclosure may further include a third sensor 313 configured to sense air inhaled through the first through hole 311, and formed on the printed circuit board 344. As illustrated in FIG. 14B, the first through hole 311 is formed at one side of the interface unit 160, and air is inhaled into the mobile terminal 100 through the first through hole 311. The inhaled air is prevented from being moved into the mobile terminal 100 by means of a pad 314 disposed at a lower portion of the third sensor 313. Furthermore, it is further sealed by a rib 351a formed from the first antenna module 351 to the pad 315.

Here, a space is sealed by the first antenna module 351 and pad 314, and the inhaled air remains within the sealed space (S).

The third sensor 313 may sense the inhaled air, and may be a gas sensor or temperature and humidity sensor. If the third sensor 313 is a gas sensor, then the mobile terminal may check whether or not there are any hazardous substances in the inhaled air to notify it to the user using an alarm or the like, and may be used for alcohol measurement. Furthermore, when the third sensor 313 is a temperature and humidity sensor, the mobile terminal mobile terminal 100 may information on the ambient temperature and humidity to the user. For example, the mobile terminal may output various alarm sounds or multimedia reproduced sound through the audio output unit 352b as illustrated in FIGS. 27A and 27B to notify dangerous situations to the user.

Furthermore, when the third sensor 313 is a temperature and humidity sensor, the third sensor 313 may be preferably disposed at a portion having the smallest heat dissipated from the inside of the mobile terminal 100. For example, in case where many electronic elements are mounted on an upper portion of the printed circuit board 344 like the rear case 102 in FIG. 23, the third sensor 313 may be preferably mounted disposed at a lower portion of the mobile terminal 100. Moreover, the third sensor 313 is formed at a lower portion of the mobile terminal with the least human body contact as well as the lowest heat dissipation since the human body's effect should be minimized. However, it is only an example, and any portion with low heat dissipation from the human body or terminal itself may be used for the third sensor 313.

On the other hand, there may be a case where the first through hole 311 becomes clogged by dust or the like, a member (not shown) having a mesh structure may be formed on the first through hole 311 to prevent this.

In order to remove foreign substances or the like filled in the first through hole 311 and sealed space (S), according to an embodiment of the present disclosure, a second through hole 315 is formed on the first antenna module 351. The second through hole 315 is not seen from the outside, and thus only the first through hole 311 is exposed at normal times, but the second through hole 315 is exposed when the rear cover 103 is removed. Foreign substances within the sealed space (S) may be removed by injecting high-pressure air through the second through hole 315. For an example, the user may blow a strong wind to remove foreign substances such as dust or the like within the sealed space (S). Here, a protrusion portion 1031 may be formed to cover the second through hole 315 at one side of the rear cover 103 covering the rear case 102 may be formed to prevent dust or the like from being inhaled into the mobile terminal 100a through the second through hole 315.

Figure 31:
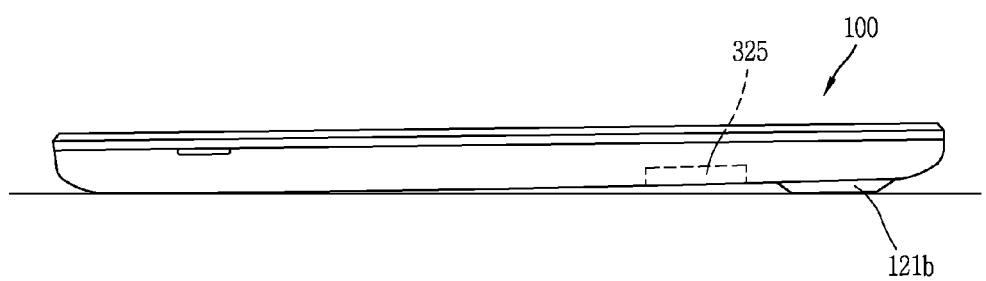
FIG. 31 is a schematic side view illustrating a mobile terminal associated with an embodiment of the present disclosure.

FIG. 31 is a schematic side view illustrating a mobile terminal associated with an embodiment of the present disclosure. As illustrated in FIG. 31, according to an embodiment of the present disclosure, the rear camera 121b is protruded outside, and the rear input unit 325 is recessed into the mobile terminal 100 or less protruded than the rear camera 121b, and the rear input unit 325, more particularly, the first button portion 325a, is not allowed to be directly brought into contact with the ground (bottom). As a result, a scratch is not generated on a surface of the first button portion 325a of the rear input unit 325, thereby allowing a sensor such as RGB disposed therewithin to perform its own function.

Moreover, even when the first sensor 310 or a second sensor 320b which will be described later is a fingerprint sensor, the formation of a scratch may be prevented to normally sense fingerprint recognition.

In general, a capacitive mode is used for a method of recognizing a user's fingerprint, which is based on a principle that a change of electric field flowing through a human body is sensed according to the curvature of ridges. Furthermore, it is divided into an area mode and a swipe mode according to the type of reading a fingerprint. The area mode is a mode in which a predetermined area of fingerprint is read while touching a user's fingerprint, and the swipe mode is a mode in which information on a portion of fingerprint is acquired while sliding a user's fingerprint and then partial fingerprint information are added to complete a full fingerprint. The area mode may be referred to as a touch mode, and the swipe mode may be referred to as a sliding mode.

According to an embodiment of the present disclosure, both the area mode and swipe mode may be applicable to a fingerprint sensor, but the area mode is more preferable due to a spatial restriction for sliding. However, the present disclosure may not be necessarily limited to this.

The swipe type fingerprint sensor 310 reads local fingerprint images in a sliding mode, and then combines the local fingerprint images into one image to implement one complete fingerprint image, thereby performing fingerprint recognition. To this end, according to an embodiment of the present disclosure, a user may slide his or her finger on the rear input unit 325 in contact with the rear input unit 325 to acquire partial fingerprints, and obtain a complete fingerprint in consideration of its sliding speed. The complete fingerprint may be compared with a previously registered image to prove the user's authenticity.

On the other hand, when an area type fingerprint sensor is used, the rear input unit 325 may be formed to scan a user's fingerprint for applying a push input along with the push input applied thereto. More specifically, the fingerprint sensor 310 is mounted at a lower portion of the first button portion 325a, and a fingerprint brought into contact with the first button portion 325a is recognized through this. The first button portion 325a presses a switch 350 by means of the push. When the switch 350 is pressed, the controller 180 may sense a push input to process the relevant control command.

Referring to FIGS. 15 and 20, a through hole 3251 is formed within the second button portion 325b. Though not shown in the drawing, a ring member 316 may be formed between the first button portion 325a and second button portion 325b. The ring member 316 performs a function of recognizing a touch when a user touches the first button portion 325a of the rear input unit 325. In other words, when the user touches the first button portion 325a, the controller 180 may operate a capacitive touch sensor to activate the fingerprint sensor 310.

Similarly, a through hole 3041 formed on the supporting member 304 may be formed thereon, and a ring member 317 may be also formed between the first button portion 325a and the supporting member 304. In other words, the ring member 315 317 may be formed between the first button portion 325a and second button portion 325b and/or between the first button portion 325a and the supporting member 304 to recognize a user's touch intention, thereby activating the fingerprint sensor. Here, the ring member 316, 317 is made of a metal material.

As described above, a mobile terminal according to an embodiment of the present disclosure may further include a fingerprint sensor 310 for recognizing fingerprint information. When power is on or a user is logged in to a search site, the mobile terminal may first recognize the user's fingerprint information through the fingerprint sensor 310, and then log in to execute an application.

For example, there is a case where user's login information (information on his or her own certification) is requested from a search site, and when a login window for requesting the user's certification is displayed on the display unit 151 as described above, the user's fingerprint information may be recognized by the fingerprint sensor 310 to automatically log in.

In this manner, the fingerprint sensor 310 may be used as a functional key associated with power on/off. For example, when the first button portion 325a is pressed in a state that the power of the terminal is off or in an idle state, power is supplied to the fingerprint sensor 310 to perform fingerprint recognition.

The mobile terminal determines whether or not the recognized fingerprint corresponds to a user's fingerprint, and when the recognized fingerprint is the user's fingerprint, power is turned on and the terminal is subsequently booted. When power is turned on in this manner, subsequent to the completion of terminal booting, the display unit may immediately enter a home screen page without passing through a locked screen.

Furthermore, when the first button portion 325a is pushed for a predetermined period of time in a power-on state, power is turned off. Even in this state, when a fingerprint recognized by the fingerprint sensor 310 is determined as a user's fingerprint, the power of the terminal is turned off. At this time, a display window for asking the user whether or not to turn off the power is shown on the display unit 151, thereby allowing the user to make a touch to turn off the power.

When the first button portion 325a is pushed, power is typically turned on or off, but only the first button portion 325a is merely pressed by the user's setting, thereby preventing power from being turned on or off. In other words, power on/off due to the foregoing fingerprint sensor 310 performs his or her desired control command by pressing the first button portion 325a, but the control command is carried out only in a state that user's certification has been completed.

If the recognized fingerprint does not correspond to a user's fingerprint, then power on and terminal booting will be suspended. In this case, the terminal may display a warning message indicating that it is not the user's fingerprint. The warning message may be configured to provide a lighting effect for a predetermined period of time on a front surface of the terminal by means of the optical output unit 154 or output a sound effect through the audio output unit 152.

For another example, when a push input is applied to the rear input unit 325 in a lock mode in which a locked screen is displayed on the display unit 151, the locked screen may be switched to a home screen page while the lock is released. In this case, the rear input unit 325 may be a hot key for performing lock release.

However, the lock release is carried out only when the fingerprint sensor 310 recognizes a user's fingerprint in contact with the fingerprint sensor 310 for a push operation and the recognized fingerprint corresponds to a prestored user's fingerprint. During fingerprint recognition, a notification message indicating that a fingerprint is being recognized may be displayed on the display unit of the terminal to indicate the fingerprint recognition.

Figure 22:
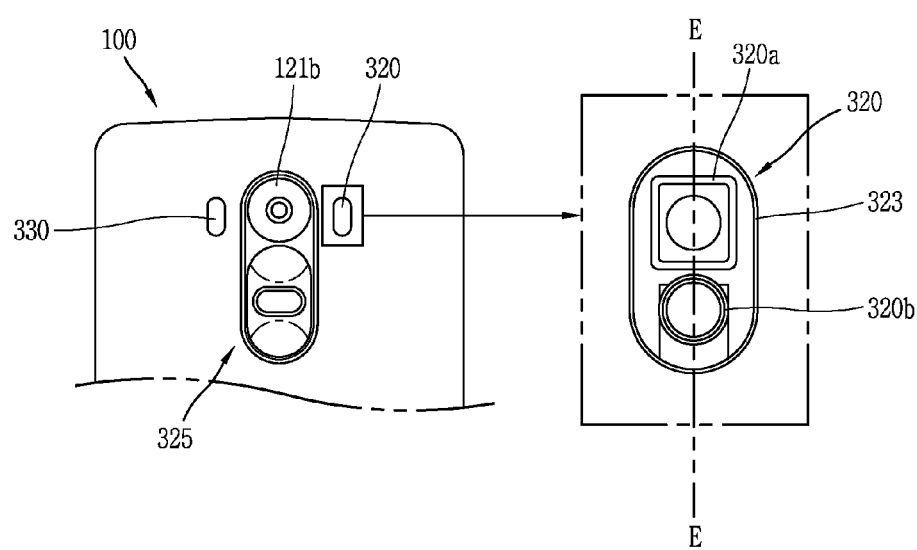
FIG. 22 is a view illustrating a flash unit of a mobile terminal associated with an embodiment of the present disclosure.
Figure 23:
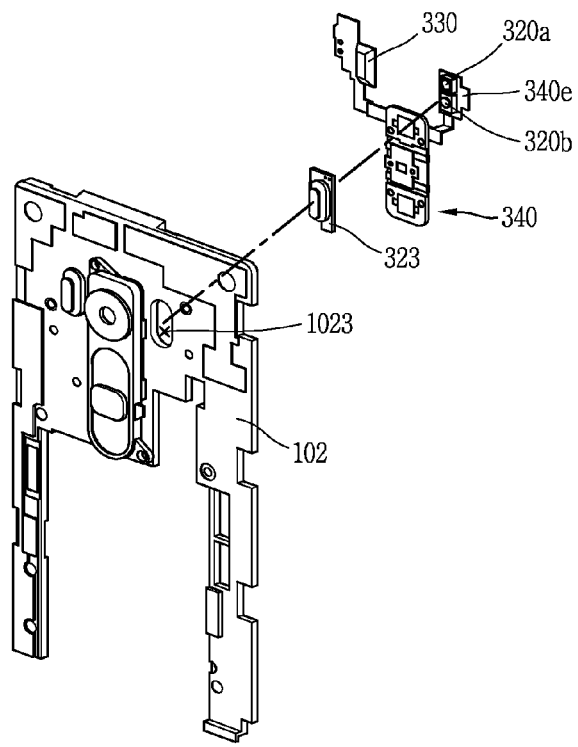
FIG. 23 is a partial exploded perspective view illustrating a mobile terminal associated with an embodiment of the present disclosure.
Figure 25:
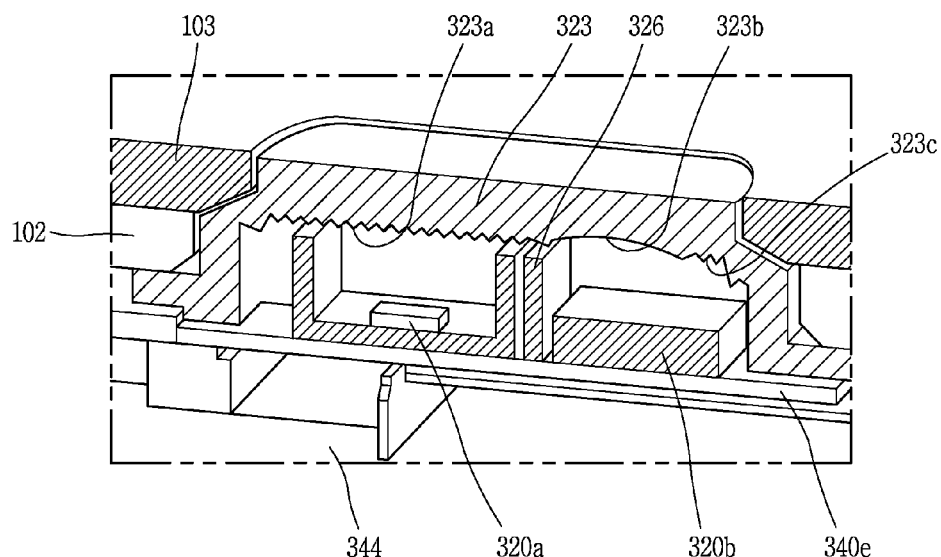
FIG. 25 is a perspective view of FIG. 24.

On the other hand, FIG. 22 is a view illustrating a flash unit of a mobile terminal associated with an embodiment of the present disclosure, and FIG. 23 is a partial exploded perspective view illustrating a mobile terminal associated with an embodiment of the present disclosure, and FIG. 24 is a cross-sectional view taken along line E-E of FIG. 22, and FIG. 25 is a perspective view of FIG. 24. Hereinafter, the present disclosure will be described with reference to FIGS. 22 through 25.

First, as illustrated in FIG. 14, the flash unit 320 may be disposed at one side of the rear input unit 325 according to another embodiment of the present disclosure, and a second sensor 320b formed on a single bracket 323 along with a flash 320a may be provided. In other words, various sensors may be required to be disposed on a rear surface of the mobile terminal 100, the flash 320a that has been previously occupied is used as a space for arranging those sensors. In other words, the flash 320a and second sensor 320b are formed and modularized into one bracket 323.

To this end, the flexible circuit board 340 is extended from the switch formation portion 340b, and may further include a flash formation portion 340e disposed with the flash 320a and second sensor 320b. The flash formation portion 340e is formed in an upward direction of the switch formation portion 340b.

FIG. 23 illustrates an exploded perspective view in a configuration that the rear input unit 325 and rear camera 121b are mounted on the rear case 102 prior to coupling the flash unit 320 thereto. Here, as illustrated above in FIG. 20, the flash unit 320 is exposed outside through the through hole 1023, and the bracket 323 is formed to cover the flash 320a and second sensor 320b.

FIGS. 24 and 25 are a cross-sectional view and a perspective view in a configuration that the flash unit 320 is coupled to the rear case 102.

Here, a partition wall 326 for isolating the flash 320a from the second sensor 320b is formed on the bracket 323 to block the effect of light due to the flash 320a on the second sensor 320b. The second sensor 320b may any one of a RGB sensor, a heartbeat sensor and a fingerprint sensor, and if the second sensor 320b is a RGB sensor for sending and receiving light, it may receive an effect caused by the flash 320a, and thus the flash 320a and second sensor 320b are separated by the partition wall 326 to block direct light coming out of the flash 320a.

Moreover, when the second sensor 320b is a RGB sensor, part 323b of a region in which the second sensor 320b is disposed on an inner surface of the bracket 323 has a convex shape toward the outside, and thus formed to have a predetermined curvature. Furthermore, a serration structure is formed on at least part 323c of a region other than a viewing angle of the RGB sensor. In other words, etching is applied to a periphery region other than the viewing angle of the RGB sensor to block noise (scattered or reflected light). The etching region may be formed over a region formed with a step on an inner surface of the bracket 323.

Even at this time, as illustrated in FIG. 24, a shield can 333a for shielding electromagnetic waves may be formed, and the second stiffener 345 may be provided at a lower portion of the flash formation portion 340e of the flexible circuit board 340 to enhance the rigidity of the flexible circuit board 340.

Furthermore, an inner surface of bracket on a region 323a disposed with the flash 320a is formed with a serration structure to uniformly disperse light. FIGS. 24 and 25 illustrate a view in which the flash 320a and second sensor 320b are separated by two partition walls 326, but may be also separated only by a single partition wall 326.

Figure 19:
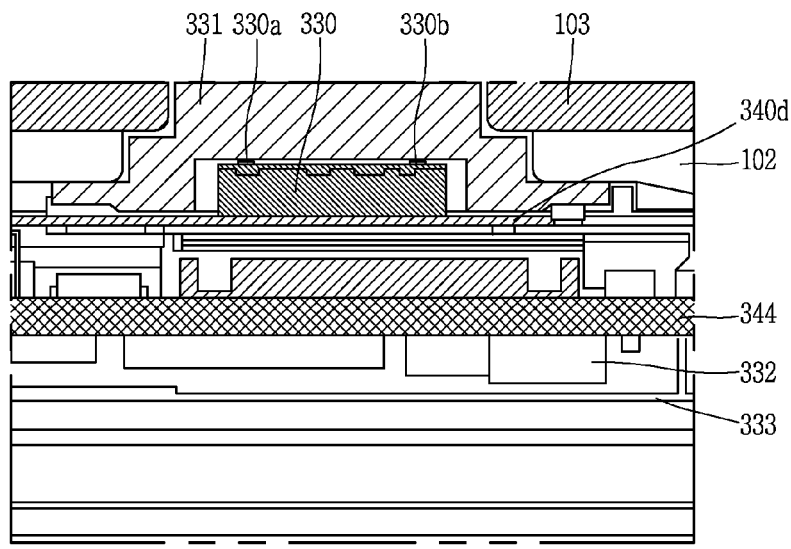
FIG. 19 is a cross-sectional view taken along line C-C of FIG. 14A.

On the other hand, FIG. 19 is a cross-sectional view taken along line C-C of FIG. 14A to describe the auto focusing device 330. The auto focusing device 330 is disposed on the auto focusing device formation portion 340d of the auto focusing device formation portion 340d, and the auto focusing device formation portion 340d is electrically connected to the printed circuit board 344. Here, electronic elements 332 may be formed on one side or both sides of the printed circuit board 344, and electromagnetic waves are shielded by the shield can 333.

Here, the auto focusing device 330 is disposed within an LDAF window 331, and the LDAF window 331 should be a light transmitting material since the auto focusing device 330 measures a distance using laser. In other words, the auto focusing device 330 includes a light emitting portion 330a for transmitting laser and a light receiving portion 330b for receiving laser, and performs a function of measuring a distance using a phase difference between an output signal being transmitted and a reception signal being received as well as getting auto focus when capturing a photo or video using this.

In other words, auto focusing (AF) in the related art takes time to cover the entire screen due to focusing through an image processing without laser, but the auto focusing device 330 measures a distance with a phase difference through laser, and thus focusing is quickly processed with laser for a distance between 0-50 cm and processed with a conventional AF mode for the remaining distance.

The foregoing present invention may be implemented as codes readable by a computer on a medium written by the program. The computer-readable media may include all kinds of recording devices in which data readable by a computer system is stored. Examples of the computer-readable media may include a hard disk drive (HDD), a solid state disk (SSD), a silicon disk drive (SDD), a ROM, a RAM, a CD-ROM, a magnetic tape, a floppy disk, and an optical data storage device, and the like, and also include a device implemented in the form of a carrier wave (for example, transmission via the Internet). In addition, the computer may include the controller 180 of the mobile terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
   a terminal body having a front surface and a rear surface;
   a rear input unit comprising a first button portion externally exposed from the rear surface to receive a push input with a first function and a second button portion provided with keys disposed at both sides, respectively, around the first button portion to receive a push input with a second function different from the first function; and
   a sensor disposed at a lower portion of the first button portion,
   wherein the second button portion is provided with a through hole accommodating the first button portion to dispose the first button portion between the keys, and
   the sensor is disposed to overlap with an inner region of the through hole, and at least part thereof is formed to overlap with a first switch for activating the first button portion.

2. The mobile terminal of claim 1, further comprising:
   a flexible circuit board disposed at a lower portion of the first and the second button portion,
   wherein the flexible circuit board comprises:
   a sensor formation portion formed with the sensor; and
   a switch formation portion connected to the sensor formation portion and at least part of which is separated to vertically overlap with the sensor formation portion, and formed with a first and a second switch for activating the first and the second button portion, respectively.

3. The mobile terminal of claim 2, wherein the switch formation portion comprises a first switch formation portion formed with the first switch and a second switch formation portion formed with the second switch, and the first and the second switch formation portion are formed on the same plane or different planes.

4. The mobile terminal of claim 3, wherein the first and the second switch formation portion are integrally formed when the first and the second switch formation portion are formed on the same plane, and
the first switch formation portion is separated from the sensor formation portion, and electrically connected to the second switch formation portion by means of an elastic connecting member.

5. The mobile terminal of claim 3, further comprising:
a protrusion for electrically connecting the first switch or second switch to a flexible circuit board when pressing the first or the second button portion,
wherein the protrusion comprises a first protrusion for pressing the first switch and a second protrusion for pressing the second switch, and
the first switch is disposed on an upper surface or lower surface of the first switch formation portion.

6. The mobile terminal of claim 5, wherein the first protrusion is formed on a lower surface of the sensor formation portion when the first switch is formed on an upper surface of the first switch formation portion, and
the first protrusion is formed in contact with the first switch when the first switch is formed on a lower surface of the first switch formation portion.

7. The mobile terminal of claim 5, wherein a stiffener for enhancing the rigidity of the sensor formation portion and switch formation portion is disposed between the sensor formation portion and switch formation portion.

8. The mobile terminal of claim 3, wherein a slit is formed between the first switch formation portion and second switch formation portion.

9. The mobile terminal of claim 1, wherein the sensor is a RGB sensor or fingerprint sensor.

10. The mobile terminal of claim 9, wherein an inner surface of the first button portion has a predetermined curvature when the sensor is a RGB sensor.

11. The mobile terminal of claim 9, wherein when the sensor is a fingerprint sensor, a sliding or touch mode is applied to the fingerprint sensor.

12. The mobile terminal of claim 11, wherein the first function comprises a power on/off function, and recognizes user's fingerprint information by means of the fingerprint sensor when pressing the first button portion to turn on or off power in a state that his or her own certification has been completed.

13. The mobile terminal of claim 12, wherein a lock of the mobile terminal is automatically released when touching the fingerprint sensor to enter a home screen page.

14. The mobile terminal of claim 12, wherein when a login window requiring his or her own certification is displayed through the display unit, the user's fingerprint information is recognized by the fingerprint sensor to be automatically logged in.

* * * * *